(12) United States Patent
Goda et al.

(10) Patent No.: US 8,202,457 B2
(45) Date of Patent: Jun. 19, 2012

(54) METHOD AND APPARATUS FOR PRODUCING BATTERY PACK

(75) Inventors: Yoshio Goda, Osaka (JP); Yoshinori Koyanagi, Osaka (JP)

(73) Assignee: Panasonic Corporation, Osaka (JP)

( * ) Notice: Subject to any disclaimer, the term of this patent is extended or adjusted under 35 U.S.C. 154(b) by 281 days.

(21) Appl. No.: 12/740,297

(22) PCT Filed: Dec. 1, 2008

(86) PCT No.: PCT/JP2008/003545
§ 371 (c)(1),
(2), (4) Date: Apr. 28, 2010

(87) PCT Pub. No.: WO2009/072262
PCT Pub. Date: Jun. 11, 2009

(65) Prior Publication Data
US 2010/0258975 A1    Oct. 14, 2010

(30) Foreign Application Priority Data

Dec. 5, 2007  (JP) .................................. 2007-315140
Dec. 5, 2007  (JP) .................................. 2007-315141
Dec. 5, 2007  (JP) .................................. 2007-315142

(51) Int. Cl.
*B29C 45/14* (2006.01)
(52) U.S. Cl. ..................... 264/161; 264/272.21; 425/567
(58) Field of Classification Search .................. 264/161, 264/272.21; 425/567, 569, 572, 574
See application file for complete search history.

(56) References Cited

U.S. PATENT DOCUMENTS

| | | | | |
|---|---|---|---|---|
| 3,918,870 | A * | 11/1975 | Tetzlaff | 425/543 |
| 6,887,419 | B2 * | 5/2005 | Payette et al. | 264/328.9 |
| 2003/0173709 | A1 | 9/2003 | Iwaizono et al. | |
| 2004/0119203 | A1 * | 6/2004 | Keirstead et al. | 264/328.1 |
| 2005/0064286 | A1 | 3/2005 | Kozu et al. | |
| 2005/0112456 | A1 | 5/2005 | Kozu et al. | |

FOREIGN PATENT DOCUMENTS

| | | |
|---|---|---|
| JP | 64-020110 | 1/1989 |
| JP | 2000-315483 | 11/2000 |
| JP | 2002-134077 | 5/2002 |
| JP | 2003-242947 | 8/2003 |
| JP | 2003-308815 | 10/2003 |

* cited by examiner

*Primary Examiner* — Joseph Del Sole
*Assistant Examiner* — James Sanders
(74) *Attorney, Agent, or Firm* — McDermott Will & Emery LLP

(57) ABSTRACT

A tensile stress is applied to solidified resin. The tensile stress is so small that the solidified resin formed in the sprue by solidification of molding material does not break and is so large that the solidified resin formed in the sprue is separated from the inner surface of the sprue due to a reduction in the diameter of the cross sectional area thereof. For the application of such a tensile stress, the runner stripper plate holding the solidified resin is moved away from the nozzle and sprue bushing. This state is maintained for a predetermined time to separate the solidified resin from the inner surface of the sprue.

18 Claims, 15 Drawing Sheets

METHOD AND APPARATUS FOR PRODUCING BATTERY PACK

RELATED APPLICATION

This application is the U.S. National Phase under 35 U.S.C. §371 of International Application No. PCT/JP2008/003545, filed on Dec. 1, 2008, which in turn claims the benefit of Japanese Application Nos. 2007-315140, filed on Dec. 5, 2007, 2007-315141, filed on Dec. 5, 2007 and 2007-315142, filed on Dec. 5, 2007, the disclosures of which Applications are incorporated by reference herein.

TECHNICAL FIELD

The invention relates to a method and apparatus for producing a battery pack comprising a secondary battery and a circuit board which are integrally joined with a resin molded part and coated with a resin film.

BACKGROUND ART

Portable electronic devices such as cell phones and PDAs are becoming significantly smaller, thinner, and more sophisticated. Accordingly, batteries for use as the power source therefor are also required to be smaller, thinner, and higher in capacity. Promising batteries which permit small size and high capacity are lithium ion secondary batteries. Among them, flat and prismatic ones are suitable for thinning devices. Thus, such prismatic lithium ion secondary batteries are increasingly used as the power source for portable electronic devices as mentioned above.

However, lithium ion secondary batteries have high energy density and use an inflammable organic solvent as the electrolyte, so they are more likely to encounter abnormal conditions due to electrical, mechanical and thermal factors than other batteries. It is thus important to give consideration to safety. As such, lithium ion secondary batteries are usually used as battery packs, comprising a battery and a safety mechanism contained in a pack case, especially when used as the power source for portable electronic devices. More specifically, in a battery pack, a mechanism for preventing a battery from encountering an abnormal condition and, for example, a thermal fuse for preventing the battery from heating up in the event of an abnormal condition are packed in a pack case, with the thermal fuse being incorporated into the wiring. Also, in a battery pack, a lithium ion secondary battery is packed in a pack case while being connected to a circuit board with a battery protection circuit for protecting the battery from overcharge and overdischarge.

A conventional pack case is composed of a lower case for housing a battery body and an upper case serving as a lid which are joined by a bonding method such as ultrasonic bonding. However, in such a pack case, it is necessary to provide each of the lower case and the upper case with a bonding portion of certain thickness, thereby resulting in an increase in the volume and weight of the pack case.

Thus, a method as described in Patent Document 1 has been proposed. The method comprises placing a battery connected to a circuit board and the like in a mold, in this state, filling a molten resin into the mold so as to encapsulate the battery and the circuit board with the resin, and allowing the filled resin to solidify to directly form a pack case around the battery, the circuit board, and the like (see FIG. 1 of Patent Document 1). This permits a reduction of the volume of the pack case and hence the weight to a certain extent.

However, in the method of Patent Document 1, in order to heighten the capacity of a lithium ion secondary battery as a battery pack, it is necessary to form a very thin pack case to heighten the volume ratio of the secondary battery to the battery pack. However, in order to mold a very thin pack case, it is necessary to introduce expensive facilities such as the latest molding apparatus and employ a highly skilled molding technician, thereby resulting in a significant increase in costs.

To address this, Patent Documents 2 and 3 propose the following method for producing a battery pack. The method comprises: 1) placing a circuit board with a battery protection circuit, external connection terminals, etc. on the seal plate side of a secondary battery, with a space between the circuit board and the secondary battery; 2) forming a resin molded part (first molded part) in the space to produce a battery pack intermediate product comprising the circuit board and the lithium ion secondary battery which are joined integrally; and 3) covering it with a second molded part and a resin sheet to produce a battery pack (see Patent Document 2 and FIG. 2 of Patent Document 3). According to this method, a battery pack can be produced by simply wrapping a separately prepared thin resin sheet around the battery pack intermediate product including the first molded part and the second molded part which can be easily molded. Therefore, there is no need to mold the above-mentioned very thin resin around the battery, and the above-mentioned technical and cost problems are resolved. As a result, the volume ratio of the secondary battery to the battery pack can be made 85% or more without increasing the cost.

Patent Document 1: Japanese Laid-Open Patent Publication No. 2002-134077

Patent Document 2: Japanese Laid-Open Patent Publication No. 2003-242947

Patent Document 3: Japanese Laid-Open Patent Publication No. 2003-308815

DISCLOSURE OF THE INVENTION

Problem to be Solved by the Invention

However, in order to commercialize the battery pack proposed by Patent Documents 2 and 3, the following problems need to be solved. That is, what kind of resin should be used as the material (molding material) for forming the above-mentioned resin molded part is actually important.

For example, when a flame-retarded resin such as polycarbonate is used as the molding material, the molding temperature needs to be as high as approximately 310° C. to obtain both good moldability and fluidity of the molten resin. Also, the mold needs to be held at high temperatures of approximately 60 to 70° C. to obtain good fluidity of the molten resin. Further, the molding pressure needs to be as high as approximately 2300 kgf/cm$^2$ to obtain high molding accuracy.

However, when a secondary battery and a circuit board are integrally molded in such conditions, a heat sensitive element attached to the secondary battery for securing the safety of the battery pack, such as a thermal fuse, PTC device, or bimetal thermostat, is damaged. Also, the secondary battery itself is highly likely to be damaged by heat and pressure, thereby resulting in impaired battery capacity. Therefore, the above-mentioned molding material is highly impractical.

The present inventors have made diligent research and arrived at the use of polyamide adhesives or polyurethane adhesives as the molding materials. These adhesives permit molding at low temperature and low pressure, thus being advantageous in that the effect of heat and pressure on the circuit board and the secondary battery is small and that the molding facilities can be inexpensive. However, when a molten polyamide adhesive or polyurethane adhesive injected into a mold solidifies, it exhibits rubber like elasticity and high adhesive power. Hence, the molding material strongly adheres to the inner surface of the runner system (runner, sprue, and the like) of the mold. Therefore, when the mold is released, the solidified resin formed in the runner system by solidification of the molding material often breaks and remains in the runner or sprue. If such an event occurs, the operation of removing the solidified resin has to be performed to continue the molding.

The removal operation is a complicated process comprising, for example, inserting a heated metal wire into the runner or the like to partially melt the solidified resin by the heat, allowing it to solidify again so that the solidified resin adheres to the metal wire, and in this state, pulling the metal wire from the runner or the like to pull out the solidified resin adhering to the metal wire. During this operation, all the related production lines must be suspended, and thus, frequent occurrence of such an event requiring the removal operation results in a significantly decreased productivity.

Also, in particular, in the runner gate positioned at the border between the runner and the cavity, the solidified resin is also thin. If the solidified resin breaks and remains therein, it is very difficult to take out the solidified resin from the narrow runner gate.

Further, when the mold is opened and the solidified resin in the runner is pulled out from the runner, the solidified resin may decrease in diameter and breaks due to poor mold releasability. In this case, the solidified resin remaining in the runner is joined to the resin molded part, which is a molded article, through the runner gate. In this state, if the mold portion with the runner is separated from the mold portion in which the resin molded part is formed to open the mold, the resin molded part is pulled by the solidified resin in the runner, so that the resin molded part becomes deformed or cracked, thereby resulting in defects of the battery pack in performance or appearance. Also, after the battery pack intermediate product with the solidified resin adhering to the molded part is ejected from the mold, if the solidified resin is removed from the molded part, the molded part is subject to damage or deformation. This also results in defects of the battery pack in function or appearance.

Also, when a plurality of battery packs are simultaneously molded to increase productivity, it is common to employ a runner branching system in which a molten resin is branched through runners to feed the molten resin simultaneously to a plurality of cavities for forming resin molded parts. However, according to the runner branching system, the total volume of the runners becomes large, and the amount of solidified resin becomes large. This results in more material loss and increased costs.

Such material loss can be reduced by employing a multi-nozzle system in which the runners can be shortened. However, in this case, it is necessary to make precise adjustments such that the height positions and travel strokes of the plurality of nozzles are the same. It is also necessary to ensure that the adjusted conditions are constantly maintained. This results in increased running costs.

More specifically, in injection molding, a molten resin is fed to a mold by a nozzle capable of moving forward and backward. That is, the nozzle tip is pressed against the resin injection inlet of the mold to feed the resin from the nozzle into the mold, and after the molding, the nozzle is moved away from the resin injection inlet. In a multi-nozzle molding apparatus, it is convenient to provide a plurality of nozzles that are moved forward and backward by one moving mechanism for the same distance. Therefore, if there is variation in the position in which these nozzles are attached to the moving device, some of the nozzles do not closely adhere to the resin injection inlets, so that the molding material comprising molten resin may leak from the resin injection inlets. The solidified resin formed by the molding material leaked from the resin injection inlet becomes burrs on the edge of the solidified resin in the runner system. Therefore, after the mold is opened, when the solidified resin in the runner system is pulled out to the direction opposite to the resin injection inlet, the burrs get snagged on the opening of the resin injection inlet. As a result, the solidified resin cannot be taken out from the runner system, leading to significantly decreased productivity.

The invention is achieved in view of the above-described problems, and an object of the invention is to provide a method and apparatus for producing a battery pack in which a resin molded part for integrally joining a secondary battery and a circuit board can be formed to produce a battery pack intermediate product while achieving high productivity cost reduction.

Means for Solving the Problem

In order to achieve the above object, the invention provides a method for producing a battery pack, including a step (a) of forming a molded part between an end face of a secondary battery on a seal plate side and a circuit board disposed so as to face the end face thereof, to produce a battery pack intermediate product comprising the secondary battery and the circuit board which are joined integrally. The step (a) includes:

a step (b) of bringing a nozzle into contact with a molding material injection inlet of a mold for forming the molded part, the nozzle being provided for feeding a molding material comprising a resin of polyamide adhesive or polyurethane adhesive to the mold;

a step (c) of, after the formation of the molded part, moving the nozzle away from the molding material injection inlet to cut off, from the nozzle, solidified resin that is formed by solidification of the molding material in a runner system of the mold connected to the molding material injection inlet; and a step (d) of applying a predetermined tensile stress to the solidified resin and maintaining this state for a predetermined time to separate the solidified resin bonded to an inner surface of the runner system therefrom, the step (d) being performed as a pretreatment for the step (c).

In a preferable embodiment of the production method of the invention, the runner system includes a sprue connected to the molding material injection inlet and a plurality of runners branching off from the sprue. The step (d) is a step of separating solidified resin formed in the sprue by solidification of the molding material and bonded to an inner surface of the sprue therefrom. The step (d) is performed by moving a sprue bushing having the sprue and the nozzle away from a runner stripper plate holding solidified resin formed in the runners by solidification of the molding material for a predetermined distance, and maintaining this state for a predetermined time.

Also, in another preferable embodiment of the production method of the invention, the sprue bushing is held in a bushing holder in such a manner that it is capable of moving toward and away from the nozzle in a predetermined range and is biased toward the nozzle against pressure from the nozzle. The nozzle is moved so that the biased sprue bushing follows the movement of the nozzle and moves away from the runner stripper plate for a predetermined distance. Thereafter, the nozzle is further moved away from the runner stripper plate beyond the predetermined range to cut off the solidified resin formed in the sprue from the nozzle.

Also, in another preferable embodiment of the production method of the invention, the sprue bushing is held in a bushing holder in such a manner that it is capable of moving toward and away from the nozzle in a predetermined range and is biased toward the nozzle against pressure from the nozzle. When the nozzle is moved away from the runner stripper plate for the predetermined distance, the biased sprue bushing is moved away from the runner stripper plate, following the nozzle.

Also, in another preferable embodiment, the production method of the invention further includes a step (e) of cutting off the solidified resin formed in the runners from the molded parts. The step (e) includes:

a step (e1) of inserting a locking part provided at a tip of a lock pin into each of the runners in advance, the locking pin being provided movably relative to a movable cavity plate including the runners and cavities in which the molded parts are formed;

a step (e2) of allowing the molding material to solidify in the runners such that the molding material is joined to the locking parts; and a step (e3) of moving the lock pins away from the cavity plate that is held stationary and holds the molded parts in the cavities.

Also, in another preferable embodiment of the production method of the invention, the molding material in the nozzle is held molten until the nozzle is moved away from the sprue bushing to cut off the solidified resin from the nozzle.

Also, in another preferable embodiment of the production method of the invention, at least a part of an inner surface of the runner system is formed so as to have a surface roughness of 10 to 100 μm.

Also, in another preferable embodiment, the production method of the invention further includes a step (e) of cutting off the solidified resin formed in the runners by the solidification of the molding material from the molded parts. The step (e) includes:

a step (e4) of inserting a locking part provided at a tip of a lock pin into each of the runners in advance, the locking pin being provided movably relative to a movable cavity plate which includes cavities in which the molded parts are formed and the runners each having a rib forming part;

a step (e5) of allowing the molding material to solidify in the runners such that the molding material is joined to the locking parts; and a step (e6) of moving the lock pins away from the cavity plate that is held stationary and holds the molded parts in the cavities.

Also, the invention provides an apparatus for producing a battery pack, the battery pack production comprising forming a molded part between an end face of a secondary battery on a seal plate side and a circuit board disposed so as to face the end face thereof, to produce a battery pack intermediate product comprising the secondary battery and the circuit board which are jointed integrally. The apparatus includes:

a plurality of nozzles capable of moving forward and backward in predetermined directions, each of the nozzles being provided for feeding a molding material comprising a resin of polyamide adhesive or polyurethane adhesive to one or more cavities for foaming the molded part;

a cavity plate provided in the direction the nozzles move forward, the cavity plate having the cavities and runners communicating with the cavities;

a sprue bushing provided between each of the nozzles and the cavity plate, the sprue bushing having a sprue therethrough corresponding to each of the nozzles, the sprue communicating with the runners, the sprue having at one end an opening against which the nozzle is to be pressed, a bushing holder provided between the sprue bushings and the cavity plate, the bushing holder capable of moving forward and backward in directions parallel to the directions in which the nozzles move forward and backward, the bushing holder holding the sprue bushings in such a manner that the sprue bushings are capable of moving toward and away from the nozzles in the directions;

means for biasing the respective sprue bushings from the bushing holder toward the nozzles; and a runner stripper plate provided between the sprue bushing holder and the cavity plate, the runner stripper plate capable of moving between a molding position for forming the molded parts, in which position the runner stripper plate closely adheres to the cavity plate, and a cut-off position which is a predetermined distance away from the molding position toward the nozzles, the runner stripper plate being configured to move from the molding position to the cut-off position while holding solidified resin formed in the runners by solidification of the molding material, thereby cutting off the solidified resin formed in the runners from the molded parts. The runner stripper plate holding the solidified resin is moved away from the nozzles and the sprue bushings, so as to apply a tensile strength that is small so as not to cause breakage of solidified resin formed in the sprues by solidification of the molding material and that is so large as to separate the solidified resin formed in the sprues from inner surfaces of the sprues due to a reduction in the diameter of the cross sectional area of the solidified resin, and this state is maintained for a predetermined time.

Also, in a preferable embodiment of the production apparatus of the invention, the biasing means comprises elastic members disposed between each of the sprue bushings and the bushing holder at a predetermined angle pitch along a circle whose central axis is the sprue. A plurality of bushing guide shafts are provided at mid positions between the elastic members that are adjacent along the circle. The bushing guide shafts are configured to prevent separation of the sprue bushing from the bushing holder by being fixed to the bushing holder at one end and engaging with the sprue bushing at the other end.

Also, in another preferable embodiment, the production apparatus of the invention includes a lock pin that is fixed to the bushing holder at one end and has a locking part to be inserted into the runner at the other end. The other end is configured to be slidably inserted into an insertion hole in the runner stripper plate.

Also, in another preferable embodiment, the production apparatus of the invention includes a plate guide shaft for setting the cut-off position of the runner stripper plate to a position in which the whole solidified resin formed in the runners by the solidification of the molding material come out of the runners. The plate guide shaft is configured to guide the movement of the runner stripper plate.

Also, in another preferable embodiment, the production apparatus of the invention includes a moving distance regulating shaft fixed to the runner stripper plate at one end and engaging with the bushing holder at the other end, thereby setting the distance for which the bushing holder is moved away from the runner stripper plate to such a distance that the solidified resin formed in the sprues does not break.

Also, in another preferable embodiment of the production apparatus of the invention, at least a part of a runner system from each of the nozzles to the one or more cavities including the runners and the sprue is formed so as to have a surface roughness of 10 to 100 μm.

Also, in another preferable embodiment of the production apparatus of the invention, an inner surface of at least one of the runners and the sprue is formed so as to have a surface roughness of 10 to 100 μm.

Also, in another preferable embodiment of the production apparatus of the invention, at least one of the cavity plate and the sprue bushings is formed from heat-treated steel as a base material, and an inner surface of at least one of the runners and the sprue is formed so as to have a surface roughness of 10 to 50 μm by electrical discharge machining.

Also, in another preferable embodiment of the production apparatus of the invention, the runners have a rib forming part so that the solidified resin formed in the runner has a rib.

Also, in another preferable embodiment of the production apparatus of the invention, the rib forming part has such a shape that the rib formed is thin and flat and has a thickness of 0.3 to 0.7 mm.

Also, in another preferable embodiment of the production apparatus of the invention, the rib forming part has such a shape that the rib formed is tapered so that it widens toward a runner stripper plate side slantwise at an angle of 10 to 12° relative to the central axis of the runner.

Effect of the Invention

According to one embodiment, a resin of polyamide adhesive or polyurethane adhesive, which is capable of being molded at low temperature and low pressure, is used as the molding material. It is therefore possible to prevent the secondary battery and the circuit board from being adversely affected by high temperature and high pressure. It is also possible to protect the heat sensitive element which is often included in the circuit board. Also, the use of the above resin requiring a short molding time permits a further improvement in productivity. In addition, a predetermined tensile stress is applied to the solidified resin strongly bonded to the interior of the runner system for a predetermined time to deform the solidified resin such that the diameter of the cross-sectional shape thereof decreases, thereby gradually separating the solidified resin from the inner surface of the runner system. Thereafter, the nozzle is moved away from the resin injection inlet to cut off the solidified resin from the nozzle. As a result, it is possible to prevent the solidified resin from breaking halfway and remaining in the runner system when the nozzle is moved away from the resin injection inlet in one stroke. This permits a significant improvement in productivity.

According to another embodiment, the runner system is composed of a sprue connected to the resin injection inlet of a mold and a plurality of runners branching off from the sprue. In the case of separating the solidified resin formed in the sprue by the solidification of the molding material and bonded to the inner surface of the sprue therefrom, the above-described effect is achieved.

According to another embodiment, just when the solidified resin formed in the sprue is cut off from the nozzle, the sprue bushing moves in the direction the nozzle is moved away. Thus, the solidified resin cut off from the nozzle is forcedly drawn into the sprue. As a result, the solidified resin can be easily taken out from the sprue to the side opposite to the nozzle.

According to another embodiment, the tensile stress necessary for separating the solidified resin formed in the sprue from the inner surface of the sprue is not applied in one stroke. Instead, the tensile stress can be gradually applied by moving the sprue bushing biased toward the nozzle together with the nozzle. Therefore, even when the solidified resin is strongly bonded to the inner surface of the sprue, it is possible to separate the solidified resin from the inner surface of the sprue while reliably preventing the solidified resin from breaking halfway when it is drawn to cut off from the nozzle.

According to another embodiment, solidified resin is formed in each of the runners, with the locking part at the tip of the lock pin being embedded therein. By moving the lock pin away from the cavity plate in this state, a force is applied to the portion of the solidified resin joined to the locking part, so that a strong stripping force can be applied to the solidified resin. Thus, the solidified resin is stretched by the elasticity of the solidified resin itself and separated smoothly from the inner surface of the runner to which it is strongly bonded. This ensures that the whole solidified resin formed in the runner is pulled out of the runner.

Also, during the movement of the lock pins, the cavity plate is held stationary with the molded parts held in the cavities. This ensures that the solidified resin formed in each of the runners is cut off at the narrowest gate at the boundary between the runner and the cavity. As such, the solidified resin formed in the runner is neatly cut off from the molded part in the cavity. It is therefore possible to prevent problems such as the solidified resin breaking halfway and partially remaining in the runner.

According to another embodiment, even when the molding material leaks out between the nozzle and the sprue bushing and the leaked molding material solidifies to form solidified resin joined to the solidified resin in the sprue, the solidified resin does not completely solidify due to the heat of the molding material that remains molten in the nozzle. Therefore, the solidified resin is easily drawn into the sprue by the solidified resin in the sprue. As such, the solidified resin formed by the leaked molding material can be removed more easily.

With respect to another embodiment, polyamide adhesives and polyurethane adhesives have rubber like elasticity and high adhesive power. When such an adhesive is used as the molding material, the solidified resin formed in the runner system is strongly bonded to the inner surface of the runner system, thereby resulting in poor mold releasability. To address this problem, the inner surface of at least a part of the runner system is formed so as to have a surface roughness of 10 to 100 μm. This improves the mold releasability of the solidified resin from the inner surface of the runner system. As a result, when the solidified resin is taken out from the runner system, applying a tensile stress to the solidified resin allows the solidified resin to be easily separated from the inner surface of the runner system. This prevents the solidified resin from breaking and remaining in the runner system, thereby allowing the solidified resin to be taken out from the runner system in a more reliable manner.

With respect to another embodiment, polyamide adhesives and polyurethane adhesives have rubber like elasticity and high adhesive power. When such an adhesive is used as the molding material, the solidified resin formed in the runner system is strongly bonded to the inner surface of the runner system, thereby resulting in poor mold releasability. To address this problem, the solidified resin formed in each of the runners, which is a part of the runner system, is provided with a rib to reinforce the solidified resin. As a result, when the solidified resin is pulled in the direction opposite to the molded part to cut off the solidified resin from the molded part, it is possible to prevent breakage of the solidified resin and to prevent a broken piece from remaining adhered to the molded part. Therefore, the whole solidified resin can be easily taken out from the runner. Also, since the solidified resin is reinforced by the rib, there is no need to unduly increase the diameter of the whole solidified resin for reinforcement, and the material loss can be reduced.

According to another embodiment, the multi-nozzle molding apparatus equipped with a plurality of nozzles can produce advantageous effects while allowing a reduction in the loss of the molding material. Since the sprue bushings for the respective nozzles are independently biased toward the nozzles, formation of gaps between the respective nozzles and the sprue bushings can be prevented even without making precise adjustments such that the positions and travel strokes of the respective nozzles are the same. It is therefore possible to prevent leakage of the molding material from the joint between the nozzle and the sprue and adhesion of the leaked molding material to the tip of the solidified resin in the sprue to form burrs. As such, the solidified resin can be easily taken out of the sprue.

According to another embodiment, a predetermined tensile stress is applied to the solidified resin strongly bonded to the inner surface of the sprue for a certain period of time to reduce the diameter of the cross-sectional shape of the solidified resin, thereby making it possible to separate the solidified resin from the inner surface of the sprue. This allows prevention of a situation in which when the solidified resin in the sprue is pulled out, the solidified resin breaks halfway and a broken piece remains in the sprue.

According to another embodiment, the molding material in each of the runners solidifies with the locking part embedded therein. As a result, when the bushing holder together with the runner stripper plate is moved away from the cavity plate after molding to pull the solidified resin in the runner from the side opposite to the molded part and cut it off from the molded part, a large force can be applied to the solidified resin joined to the locking part to cut off the solidified resin from the molded part. This ensures that the solidified resin in the runner is cut off from the molded part. Also, since the end of each lock pin having the locking part is slidably inserted into the insertion hole of the runner stripper plate, the locking part joined to the solidified resin is separated from the solidified resin when the runner stripper plate is moved away from the bushing holder. As such, the solidified resin can be easily taken out of the lock pin.

According to another embodiment, the distance between the runner stripper plate and the cavity plate can be regulated suitably.

According to another embodiment, when a predetermined tensile stress is applied to the solidified resin in the sprue to separate the solidified resin from the inner surface of the sprue, a suitable tensile stress can be applied to the solidified resin. It is thus possible to prevent the solidified resin from being subjected to an excessive tensile stress and breaking in the sprue.

According to another embodiment, at least one of the runners and the sprue, where the solidified resin is thin and subject to breakage when the mold is opened, can produce advantageous effects. In particular, when the inner surface of the runner is formed so as to have a predetermined surface roughness, it is possible to prevent the solidified resin from becoming thin and breaking in the narrow runner gate at the boundary between the runner and the cavity in a reliable manner. Thus, there is no need to perform the difficult operation of taking out the solidified resin from the runner gate, thereby resulting in improved productivity. Also, when the solidified resin adhering to the molded part is removed, it is possible to prevent the molded part from becoming damaged or deformed.

According to another embodiment, at least one of the cavity plate and the sprue bushing is formed from heat-treated steel which permits good surface roughness, and the inner surface of at least one of the runners and the sprue is formed so as to have a surface roughness of 10 to 50 µm by electrical discharge machining which allows contours and cavities to be formed stably and highly evenly. Therefore, the required surface roughness can be achieved with high machining accuracy.

According to another embodiment, since the rib forming part has such a shape that the rib formed is thin and flat and has a thickness of 0.3 to 0.7 mm, the molding material solidifies sooner than the other portions in the runner. Thus, the solidified resin has a higher strength than the other portions. Hence, when the solidified resin is pulled out from the runner, it is possible to prevent breakage of the resin in a reliable manner.

According to another embodiment, the solidified resin in each of the runners has a tapered rib that widens toward the runner stripper plate side at an angle of 10 to 12°. Therefore, when the runner stripper plate is moved to pull out the solidified resin from the runner, the solidified resin can be easily pulled out.

BEST MODE FOR CARRYING OUT THE INVENTION

Embodiment 1

Embodiments of the invention are hereinafter described with reference to drawings. First, in order to facilitate understanding, a battery pack produced by the production method and apparatus of the invention is described. As an example of the battery pack, a battery pack using a flat, prismatic lithium ion secondary battery for use as the power source for a cell phone is described.

FIG. 9A to FIG. 9D illustrate a sequence of steps showing a part of the production process of a battery pack intermediate product (battery pack components) comprising a lithium ion secondary battery (hereinafter referred to as simply a secondary battery) and a circuit board which are integrally jointed together. A secondary battery 63 illustrated in the figure is composed of: an aluminum battery can 64 made of a cylinder having a bottom and a flat, oval cross-sectional shape; and power generating elements (not shown) contained therein. The opening of the battery can 64 is sealed by laser welding a seal plate 67 to the open edge.

Figure 9A:
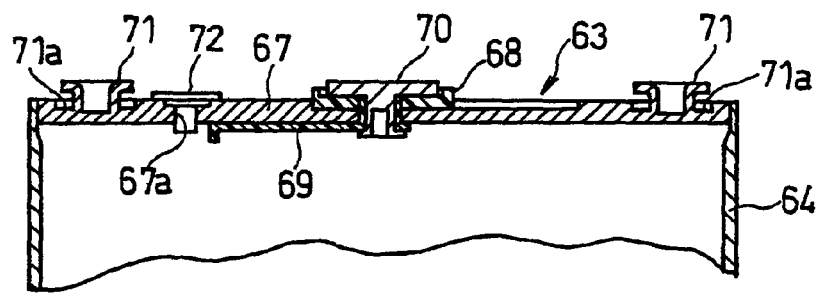
FIG. 9A is a longitudinal cross-sectional view of the upper portion of a secondary battery in an initial state in the process of forming a precursor of a battery pack intermediate product composed of the secondary battery joined with a circuit board.

FIG. 9A is a longitudinal cross-sectional view of the upper portion of the secondary battery 63 (the end on the opening side of the battery can 64). As illustrated in the figure, the seal plate 67 serving as the positive terminal of the secondary battery 63 seals the opening of the battery can 64. In the center thereof is a negative terminal 70, which is insulated by an upper gasket 68 and a lower gasket 69 and protrudes upward. Also, cylindrical, engaging protrusions 71 with a widened head are formed at both ends of the seal plate 67 by press working. At the foot of each engaging protrusion 71 is an undercut 71a, which surrounds the engaging protrusion 71. An electrolyte injection inlet 67a in the seal plate 67 is sealed with a seal stopper 72 after an electrolyte is injected into the battery can 64 therethrough.

Figure 9B:
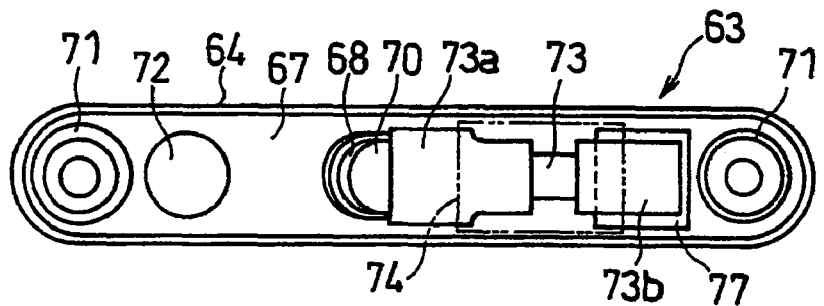
FIG. 9B is a plan view of the same secondary battery in the initial state in the same process.

FIG. 9B is a plan view of the secondary battery 63. As illustrated in the figure, a connecting part 73a of a heat sensitive element 73 is spot welded to the negative terminal 70. The heat sensitive element 73 is fixed to the seal plate 67 with heat conductive adhesive (not shown) such that the heat of the secondary battery 63 is conducted well. The heat sensitive element 73 has a protective function of preventing excessive current from flowing due to external short circuiting, and for example, a thermal fuse, a PTC device, or a bimetal thermostat can be advantageously used.

A heat insulating sheet 74 is affixed to the upper face of the heat sensitive element 73, as shown by the chain double-dashed line. When a molding material comprising molten resin is filled into the space between the secondary battery 63 and the circuit board 79 to form a resin molded part as described later, the heat insulating sheet 74 protects the heat sensitive element 73 from the heat of the resin. A connecting part 73b of the heat sensitive element 73 is placed on an insulating paper 77 affixed to the seal plate 67, while being insulated from the seal plate 67.

Figure 9C:
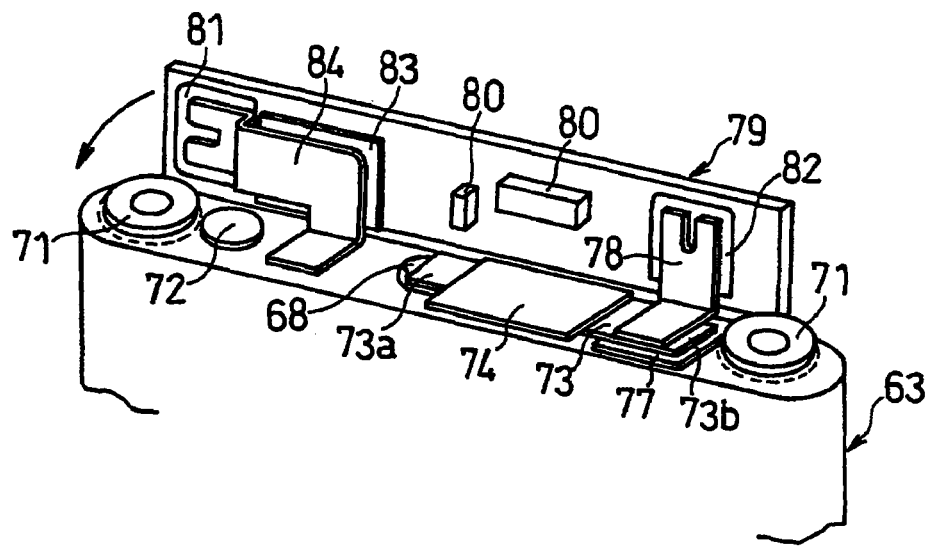
FIG. 9C is a perspective view of the same precursor in the initial state in which the secondary battery is joined with the circuit board.

As illustrated in FIG. 9C, the secondary battery 63 is fitted with a circuit board 79 which has a battery protection circuit for protecting the secondary battery 63 from overcharge and overdischarge. Mounted on one face of the circuit board 79 (the side facing the secondary battery 63) are electronic components 80 such as an integrated circuit component. In FIG. 9C, the circuit pattern and through-holes of the circuit board 79 are not illustrated.

Also, the same face has a positive electrode soldering land 81, to which one end of a positive lead plate 84 is soldered. The other end of the positive lead plate 84 is spot welded to the seal plate 67 serving as the positive terminal of the secondary battery 63. Also, an insulating paper 83 is interposed between the positive lead plate 84 and the electronic component (not shown) mounted on the circuit board 79.

The face of the circuit board 79 with the positive electrode soldering land 81 also has a negative electrode soldering land 82. One end of a negative lead plate 78 is soldered to the negative electrode soldering land 82. The other end of the negative lead plate 78 is spot welded to the connecting part 73b of the heat sensitive element 73.

As described above, with the use of the positive lead plate 84 and the negative lead plate 78, the circuit board 79 is installed on the secondary battery 63 so that it is orthogonal to the upper face of the seal plate 67.

Figure 9D:
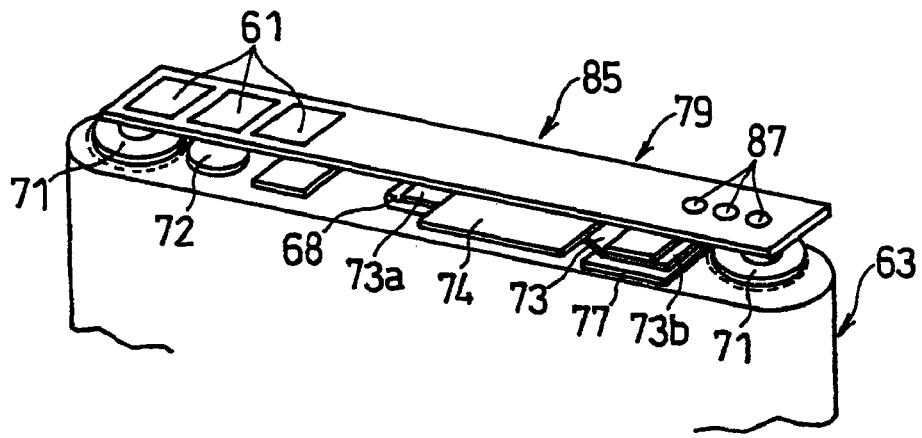
FIG. 9D is a perspective view of the same precursor in which the circuit board joined to the secondary battery is placed so as to face the upper face of the secondary battery.

As illustrated in FIG. 9D, when the positive lead plate 84 and the negative lead plate 78 are folded, the above-mentioned one face of the circuit board 79 faces the upper face of the seal plate 67 with a predetermined space therebetween. In this way, a precursor of a battery pack intermediate product 85 is produced. Thereafter, a first molded part 88 is formed in the space between the circuit board 79 and the seal plate 67 to complete the battery pack intermediate product 85, as described later. Also, the other face of the circuit board 79 has external connection terminals 61 consisting of an external positive terminal, an external negative terminal, and a temperature detection terminal and test terminals 87, which are exposed on the top face of the battery pack.

Figure 10:
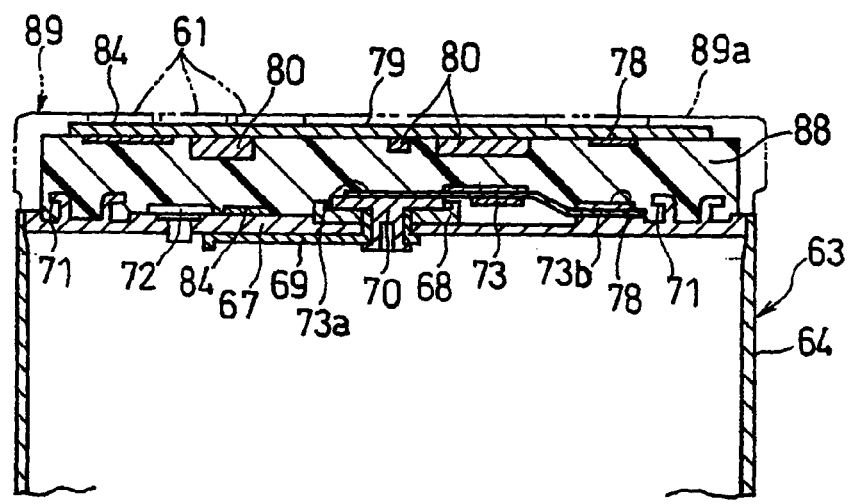
FIG. 10 is a longitudinal cross-sectional view of the main part in which the secondary battery and the circuit board are integrally joined by molding.

As illustrated in FIG. 10, a molding material is filled into the space between the seal plate 67 and the circuit board 79 to form the first molded part 88 (first molding), so that the secondary battery 63 and the circuit board 79 are integrally joined. The molten molding material filled into the space flows to the electronic component 80 mounted on the circuit board 79, the positive lead plate 84, and the negative lead plate 78, and solidifies while closely adhering to the circuit board 79. The resin also flows to the undercuts 71a around the engaging protrusions 71 on the seal plate 67, and solidifies while closely adhering to the seal plate 67. In this way, the secondary battery 63 and the circuit board 79 are firmly bonded.

After the first molding, a second molding is performed in which the portion shown by the chain double-dashed line in FIG. 10 is molded with a resin to form a second molded part 89. The second molded part 89 is composed of an upper coating part 89a covering the upper face of the first molded part 88 and the circuit board, a bottom coating part 89b covering the bottom face of the secondary battery 63 (see FIG. 11), and a connecting part 89c connecting the upper coating part 89a and the bottom coating part at the side corners of the secondary battery 63.

Figure 11:
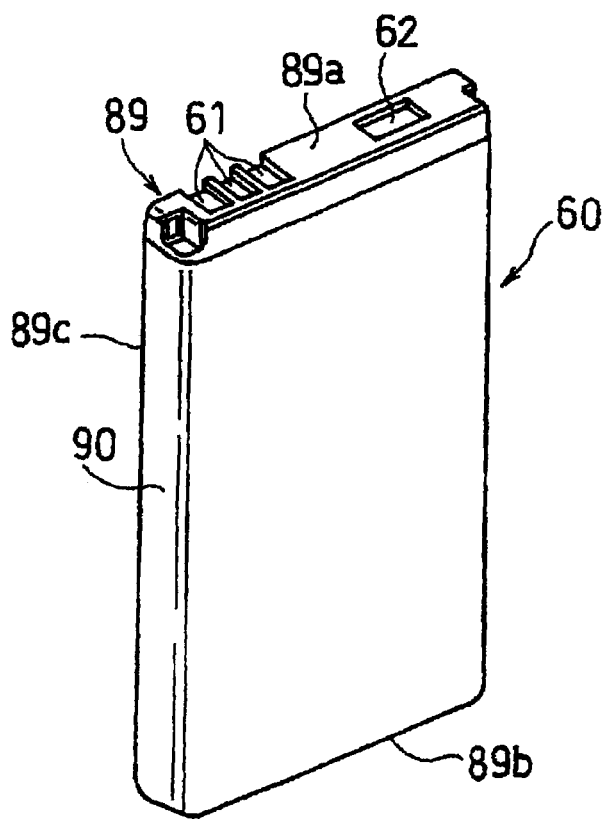
FIG. 11 is a perspective view of a battery pack produced by the production method of the invention.

Thereafter, as illustrated in FIG. 11, a thin resin sheet 90 is wrapped and affixed around the outer side face of the battery can 64, to complete a battery pack 60 having such a shape that it is easily mounted in a cell phone. In the battery pack 60, the external connection terminals 61 consisting of the external positive terminal, the external negative terminal, and the temperature detection terminal are exposed on the top end face, and a liquid submersion indicator 62 is affixed to the same end face.

Next, the molding material of the first molded part 88 is described. The resin used as the molding material of the first molded part 88 is a polyamide adhesive or polyurethane adhesive, and an example of such resin is Hot melt (trade name) composed mainly of polyamide. Hot melt is a thermoplastic-polymer based adhesive mixture that is solid at room temperature, with the solid content being 100%. It is a solvent-free, one-component adhesive which is noninflammable. Also, Hot melt is characterized in that it is superior in heat resistance, harmless, and environmentally friendly.

The reasons for the use of a polyamide adhesive or polyurethane adhesive as the molding material are that in the case of Hot melt, the molding temperature is 180 to 240° C., which is lower than those of other resins, and that the molding pressure is 3 to 50 kgf/cm$^2$, which is significantly low. Also, the use of such a molding material allows the temperature of the mold to be set to approximately 25° C., which is significantly low.

Accordingly, when a polyamide adhesive or polyurethane adhesive is used as the molding material, the molding material can be fluidized at a temperature at which the secondary battery 63 and the heat sensitive element 73 are not adversely affected by heat and pressure, and good resin molding becomes possible. It is thus possible to prevent deterioration of the battery function of the secondary battery 63 and the function of the heat sensitive element 73. In addition, since both molding temperature and mold temperature are low, the heating and cooling time of the molding material can be shortened. Hence, the time necessary for the molding process can be shortened, and the productivity can be further improved.

However, when the polyamide adhesive or polyurethane adhesive solidifies, it is firmly bonded to the inner surface of the runner system (sprues 3a, runners 10, and branch channels 11, described later) of a molding apparatus 1 due to the rubber-like elasticity and high adhesive power. Thus, when the mold of the molding apparatus 1 is opened to eject a molded part as described later, it is not easy to completely remove the solidified resin formed by solidification of the molding material in the runner system. The invention mainly intends to solve such problem.

Figure 1:
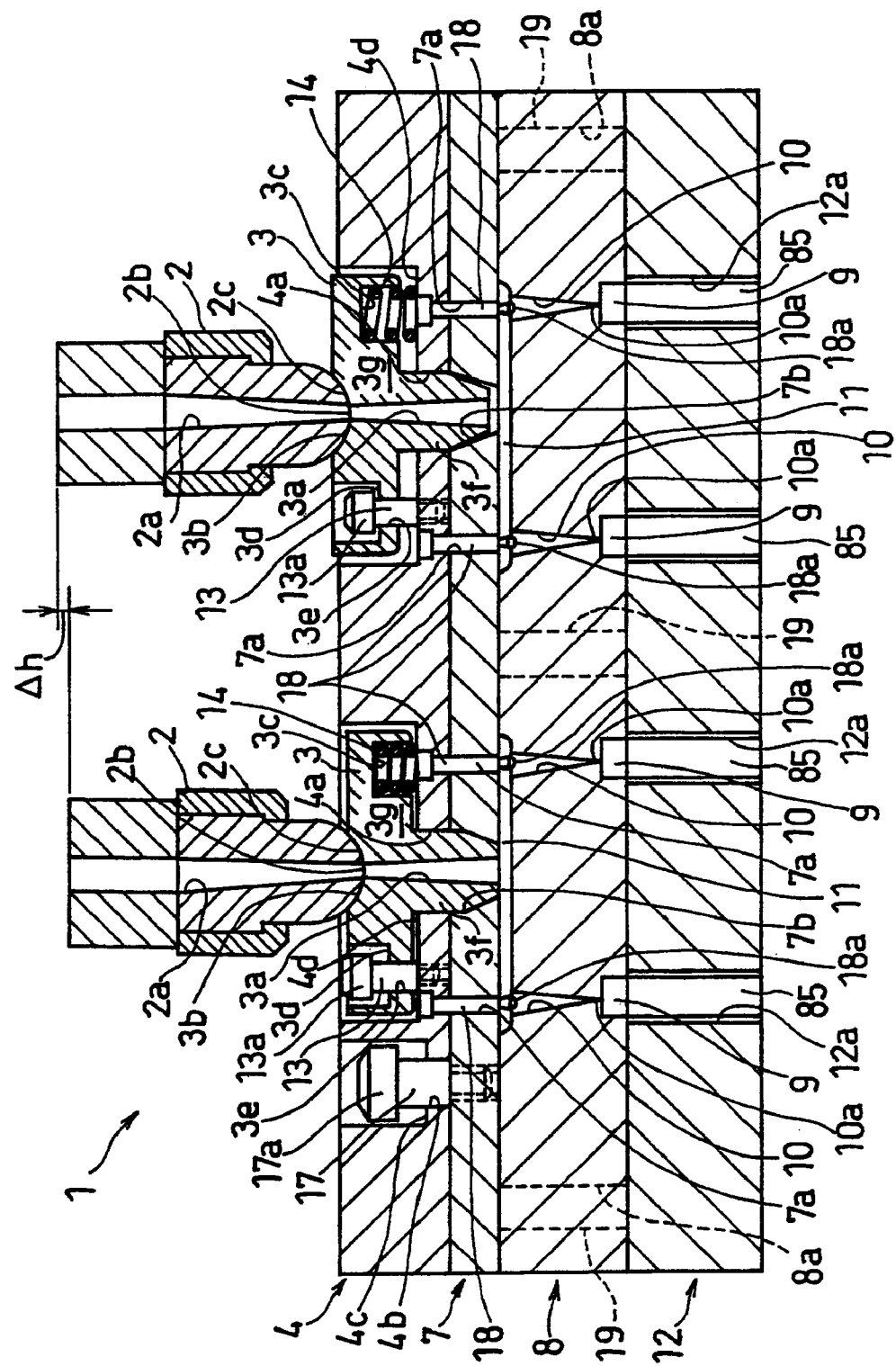
FIG. 1 is a longitudinal cross-sectional view of a molding apparatus used in the battery pack production method of Embodiment 1 of the invention, in which the mold is closed.

Next, referring to FIG. 1 to FIG. 8, the method for forming the first molded part is described in detail. FIG. 1 is a longitudinal cross-sectional view of a molding apparatus for carrying out the production method of the invention.

The molding apparatus 1 includes: a plurality of (two in the illustrated example) nozzles 2 provided on the upper side for injecting and feeding a molten resin (molding material); and a cavity plate 8 with a plurality of (four in the illustrated example) cavities 9 provided on the lower side. Also, the cavity plate 8 includes: a plurality of (four in the illustrated example) runners 10, which is a part of the runner system through which the molding material injected from an injection port 2b at the tip of each nozzle 2 is fed to the cavities 9; and a plurality of (two in the illustrated example) branch channels 11 for directing the resin to the runners 10.

Also, in the molding apparatus 1, between the nozzles 2 and the cavity plate 8 are sprue bushings 3, a bushing holder 4, and a runner stripper plate 7 in this order from top to bottom. It should be noted that of all the components of the molding apparatus 1, only relative positional relation is important and that absolute, horizontal and vertical positional relation is merely illustrative in nature for facilitating description.

Each sprue bushing 3 has a vertical sprue 3a therethrough for directing the molding material injected from the injection port 2b at the tip of each nozzle 2 to the branch channel 11. The bushing holder 4 has bushing holding parts 4d for holding the sprue bushings 3. The runner stripper plate 7 mainly serves to remove the solidified resin formed in each runner 10 from the first molded part 88, which is a molded article.

Also, under the cavity plate 8 is a base 12 for securing the first intermediate products illustrated in FIG. 9D, with the portion of each first intermediate product above the upper face of the seal plate 67 being inserted in the cavity 9. The base 12 has holding slots 12a in the side facing the cavity plate 8, and the precursor of the battery pack 85 is fitted into each holding slot 12a.

As described above, the apparatus of this embodiment is a multi-nozzle molding apparatus equipped with two nozzles, and the sprue bushings 3 are provided corresponding to the respective nozzles 2. Also, the molten resin (molding material) is fed to the two runners 10 and the two cavities 9 through the branch channel 11 which branches off into opposite sides from the lower end of the sprue 3a of each sprue bushing 3. Thus, the molding apparatus 1 is capable of molding the molding material injected from the two nozzles 2 into four first molded parts 88 for the battery packs 60 at the same time.

Next, the sprue bushing 3 is more specifically described. The sprue bushing 3 is composed of: a flange 3g shaped like a round plate; and a tubular protrusion 3f with a thick tubular wall formed on the central part of one face (lower face) of the flange 3g. The approximately half portion of the tubular protrusion 3f on the tip side is tapered so that the outer diameter decreases linearly toward the tip. The sprue 3a vertically penetrates through the flange 3g and the tubular protrusion 3f.

The flange 3g of the sprue bushing 3 is held in the bushing holding part 4d of the bushing holder 4. The tubular protrusion 3f of the sprue bushing 3 is inserted through an insertion hole 4a through the center of the bottom wall of the bushing holding part 4d, and the tip thereof is protruding downward. Also, the flange 3g of the sprue bushing 3 has a guide shaft insertion hole 3e through which a bushing guide shaft 13 is inserted. The bushing guide shaft 13 prevents the sprue bushing 3 from becoming detached from the bushing holder 4 while allowing the sprue bushing 3 to vertically move in a predetermined range. The upper side of the guide shaft insertion hole 3e has a large diameter for receiving a head 13a of the guide shaft 13, while the lower side has a small diameter such that the shaft of the guide shaft 13 is slidably inserted therethrough.

The upper end of the sprue 3*a* is open in the upper face of the flange 3*g*, and the upper end opening is shaped so as to conform to the shape of the injection port 2*b* of an injection channel 2*a* of the nozzle 2. The sprue 3*a* has such a cross-sectional shape that the diameter increases from the upper end opening toward the lower end. Also, a tip 2*c* of the nozzle 2 has a spherical face. A nozzle abutting recess 3*b*, which is in the upper face of the flange 3*g* and comes into contact with the tip 2*c*, has a spherical face with a slightly greater curvature radius than the tip 2*c* of the nozzle 2. The upper end of the sprue 3*a* is open at the center of the nozzle abutting recess 3*b*.

Also, between the flange 3*g* of the sprue bushing 3 and the inner bottom face of the bushing holding part 4*d* is a push-up spring 14 comprising a coil spring. The push-up spring 14 is disposed in a spring holding recess 3*c* in the lower face of the flange 3*g*. That is, while the sprue bushing 3 is constantly biased upward by the push-up spring 14, it is secured by the head 13*a* of the bushing guide shaft 13 so that it does not become detached. Thus, the sprue bushing 3 can move vertically in a predetermined range relative to the bushing holder 4 in response to the vertical movement of the nozzle 2.

Figure 2:
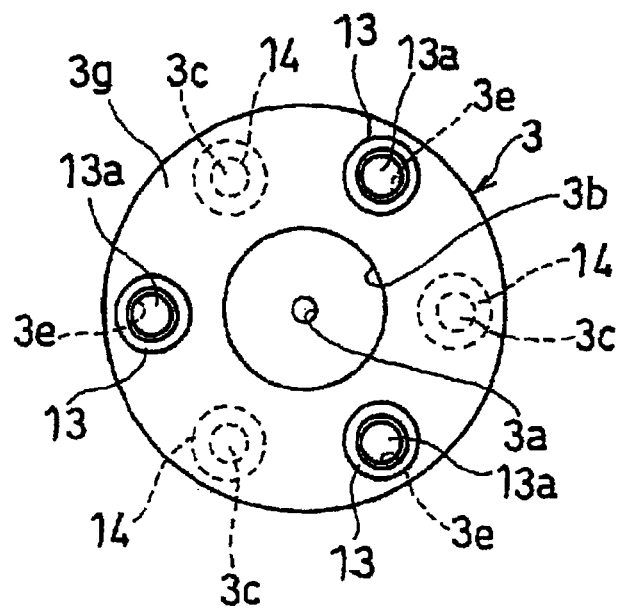
FIG. 2 is a plane view of the sprue bushing of the same apparatus.

As illustrated in FIG. 2, which is a plan view of the sprue bushing 3, there are a plurality of (three in the illustrated example) the guide shaft insertion holes 3*e* at a predetermined angle pitch (120° pitch in the illustrated example) on a circle concentric with the outer circumference of the flange 3*g* of the sprue bushing 3. Also, the spring holding recesses 3*c* are provided at midpoints between the guide shaft insertion holes 3*e* on the concentric circle at the same pitch as the pitch of the guide shaft insertion holes 3*e*. Due to this arrangement of the guide shaft insertion holes 3*e* and the spring holding recesses 3*c*, i.e., the bushing guide shafts 13 and the push-up springs 14, the whole sprue bushing 3 can be uniformly biased upward by the push-up springs 14, and the vertical movement of the sprue bushing 3 can be guided by the respective bushing guide shafts 13 in a well balanced manner.

Next, the runner stripper plate 7 is described. A position regulating shaft 17 having a male screw at the tip is fixed to the upper face of the runner stripper plate 7 by screwing the male screw into a female screw (not shown) disposed on the upper face of the runner stripper plate 7. The position regulating shaft 17 regulates the separation distance between the runner stripper plate 7 and the bushing holder 4, and a head 17*a* thereof is contained in a regulating shaft containing recess 4*c* formed in the upper face of the bushing holder 4. Also, the shaft of the position regulating shaft 17 is slidably inserted through an insertion hole 4*b* in the center of the bottom wall of the regulating shaft containing recess 4*c*.

Also, the runner stripper plate 7 has lock pin insertion holes 7*a* at positions facing the respective runners 10. Lock pins 18, one ends of which are fixed to the bushing holder 4, are slidably inserted through the lock pin insertion holes 7*a*. The other end (lower end) of each lock pin 18 has a locking part 18*a* that is shaped like the point of an arrow. In the molding apparatus 1 illustrated in FIG. 1 in which the mold is closed, the locking parts 18*a* are inserted into both ends of the branch channels 11 and the upper ends of the runners 10 adjacent thereto. Further, the runner stripper plate 7 has mating holes 7*b* at positions facing the lower openings of the insertion holes 4*a* of the bushing holder 4. Each mating hole 7*b* tapers downward and engages with the tip-side tapered portion of the tubular protrusion 3*f* of the sprue bushing 3.

Next, the cavity plate 8 is described. The cavity plate 8 serves as the movable platen of the molding apparatus 1, while the base 12 serves as the stationary platen of the molding apparatus 1. Also, each cavity 9 is a space surrounded by a recess in the lower face of the cavity plate 8 and the upper face of the seal plate 67 of the secondary battery 63 included in the battery pack intermediate product 85 held in each holding slot 12*a* of the base 12. The circuit board 79 serves as the core of the mold.

When the molding material (molten resin) filled in each cavity 9 solidifies, the first molded part 88 illustrated in FIG. 10 is formed. It should be noted that although the actual shape of the cavity 9 for forming the first molded part 88 is the shape corresponding to the molded article illustrated in FIG. 10, it is simplified in FIG. 1 and illustrated as a simple rectangular shape.

Further, the cavity plate 8 has a plurality of (three in the illustrated example) vertical guide shaft containing through-holes 8*a*, in which plate guide shafts 19 are slidably contained. The plate guide shafts 19 guide the vertical movement of the runner stripper plate 7 relative to the cavity plate 8.

The upper end of each plate guide shaft 19 is fixed to the runner stripper plate 7. Also, although not clearly shown in the figure, the lower end has a mating portion to engage with the portion of the guide shaft containing through-hole 8*a* near the upper end opening, so that the plate guide shaft 19 does not come off the guide shaft containing through-hole 8*a*.

Also, in the molding apparatus 1 illustrated in FIG. 1 in which the mold is closed, the whole plate guide shafts 19 are inserted into the guide shaft containing through-holes 8*a*. At this time, the runner stripper plate 7 closely adheres to the upper face of the cavity plate 8. As a result, the branch channels 11 are defined by the recesses in the upper face of the cavity plate 8 and the lower face of the runner stripper plate 7.

Also, when the mold of the molding apparatus 1 is opened (see FIG. 6), the mating portions of the guide shafts 19 at the lower end engage with the portions of the guide shaft containing through-holes 8*a* near the upper end openings, thereby regulating the distance for which the runner stripper plate 7 is moved away from the cavity plate 8, as described above.

Next, the step of forming the first molded parts 88 using the molding apparatus 1 is described. The battery pack intermediate products 85 produced in another step are inserted into the respective holding slots 12*a* of the base 12, for example, by a robot. Thereafter, the mold of the molding apparatus 1 is closed so that the bushing holder 4, the runner stripper plate 7, the cavity plate 8, and the base 12 closely adhere to one another, as illustrated in FIG. 1. In the molding apparatus 1 in which the mold is closed, the lower face of the runner stripper plate 7 and the recesses in the upper face of the cavity plate 8 define the branch channels 11 for branching each sprue 3*a* to two runners 10. Also, each cavity 9 is formed between the recess (corresponding to the cavity 9) in the lower face of the cavity plate 8 and the seal plate 67 of the secondary battery 63 of the battery pack intermediate product 85.

Upon completion of the closing of the mold, each nozzle 2 is lowered, and the tip 2*c* thereof contacts the nozzle abutting recess 3*b* in the upper face of the sprue bushing 3, so that the injection port 2*b* of the injection channel 2*a* of the nozzle 2 is aligned with the upper end opening of the sprue 3*a* of the sprue bushing 3. As a result, the injection channel 2*a* of the nozzle 2 communicates with the sprue 3*a*.

Figure 7:
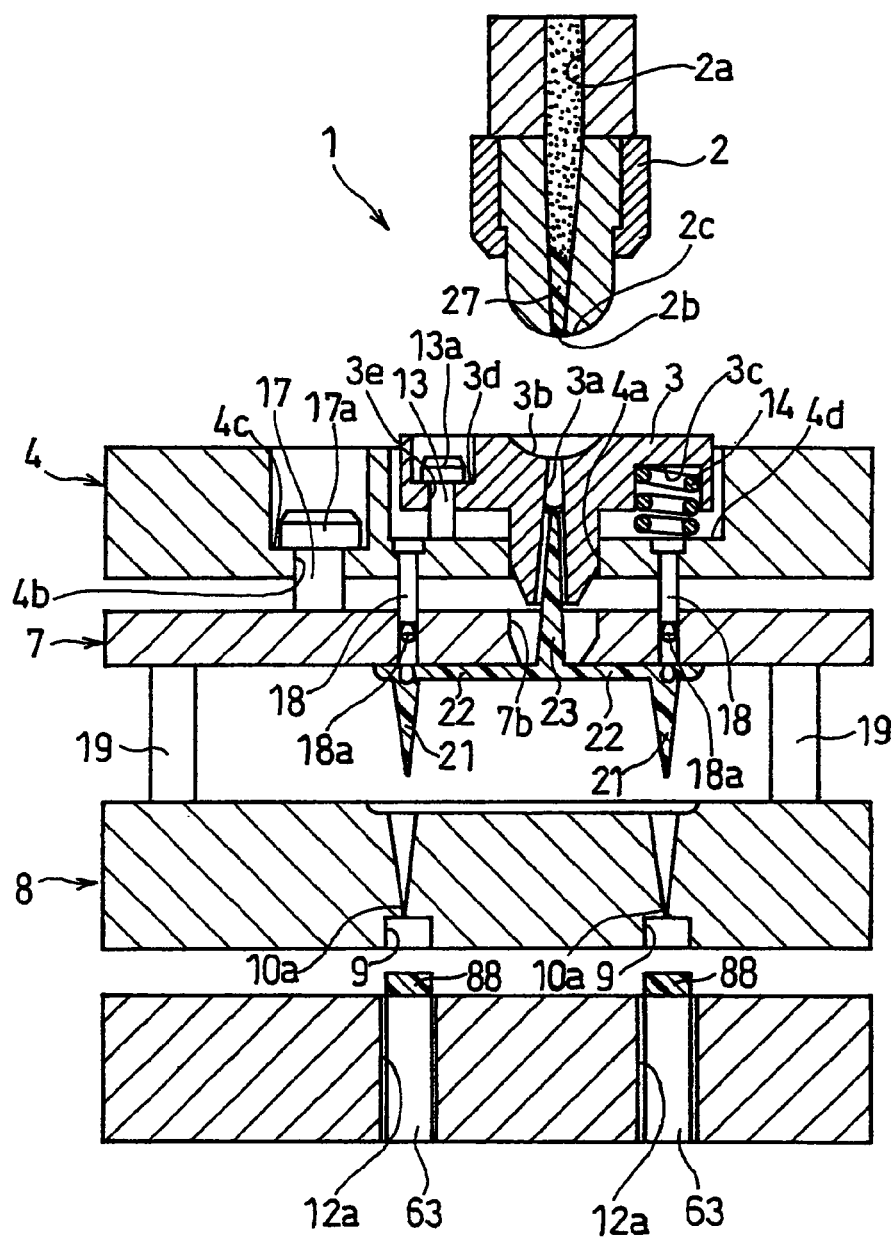
FIG. 7 is a longitudinal cross-sectional view of the same apparatus, in which the nozzle is lifted up and moved away from the sprue bushing.

When the nozzle 2 stands by in an upper limit position above the sprue bushing 3, the sprue bushing 3 is pushed up by the force applied by the push-up springs 14 up to an upper limit position in which the head 13*a* of each bushing guide shaft 13 abuts against the bottom face of a guide shaft containing recess 3*d*, for example, as illustrated in FIG. 7. When the nozzle 2 is lowered, the tip 2c thereof is pressed against the nozzle abutting recess 3b, and further, the nozzle 2 is lowered to a predetermined lower limit position as illustrated in FIG. 1, thereby pushing down the sprue bushing 3 against the force applied by the push-up springs 14.

At this time, as illustrated in FIG. 1, even if there is slight variation Δh in the heights of the respective nozzles 2 in the lower limit position, the tips 2c of the respective nozzles 2 are strongly pressed against the nozzle abutting recesses 3b of the sprue bushings 3 by the force applied by the push-up springs 14. This ensures close adhesion between the tips 2c of all the nozzles 2 and the nozzle abutting recesses 3b.

Contrary to this, in conventional molding apparatuses, the sprue bushings are fixed. Therefore, in order to constantly bring the tips of the nozzles into close contact with the nozzle abutting recesses of the sprue bushings, it is necessary to make precise adjustments so that the standard height positions and vertical strokes of the respective nozzles are the same. Such adjustments are very difficult and increase the cost. Further, even if such adjustments are made, long term operation of the molding apparatus tends to result in formation of gaps, through which the resin leaks, between the nozzle tip and the nozzle abutting recess of the sprue bushing. The leaked resin spreads laterally outside the sprue inlet and solidifies to form solidified resin connecting to the solidified resin in the sprue like a flange thereof. Therefore, upon completion of the molding step, when the solidified resin in the sprue is pulled down for removal, it is difficult to remove it since the brim-like solidified resin gets snagged on the periphery of the sprue inlet.

Contrary to this, in the apparatus of this embodiment, even if there is slight variation in the standard height positions and vertical strokes of the respective nozzles 2, the tips 2c of all the nozzles 2 and the nozzle abutting recesses 3b can be brought into close adhesion. It is thus possible to avoid the above-described problem caused by the leaking of the resin into the gaps between the tips 2c of the nozzles 2 and the nozzle abutting recesses 3b.

As a result, there is no need to make precise adjustments of the multi-nozzle molding apparatus so that the standard height positions and vertical strokes of all the nozzles are the same, and the running cost can be reduced. Also, even if the central axes of each nozzle 2 and each sprue bushing 3 are not accurately aligned, the positional deviation can be absorbed by lateral deformation of the push-up springs 14. It is thus possible to further reduce the cost.

It should be noted that FIG. 1 illustrates a gap between the tubular protrusion 3f of the sprue bushing 3 for the nozzle 2 (the right nozzle in the figure) in the higher lower limit position and the mating hole 7b of the runner stripper plate 7. This is an exaggerated illustration for the purpose of indicating that there is variation Δh in the height position a of the nozzles 2. Even if there is slight variation in the height positions of the nozzles 2, such a large gap as illustrated therein does not actually occur between the tubular protrusion 3f and the mating hole 7b.

Figure 3:
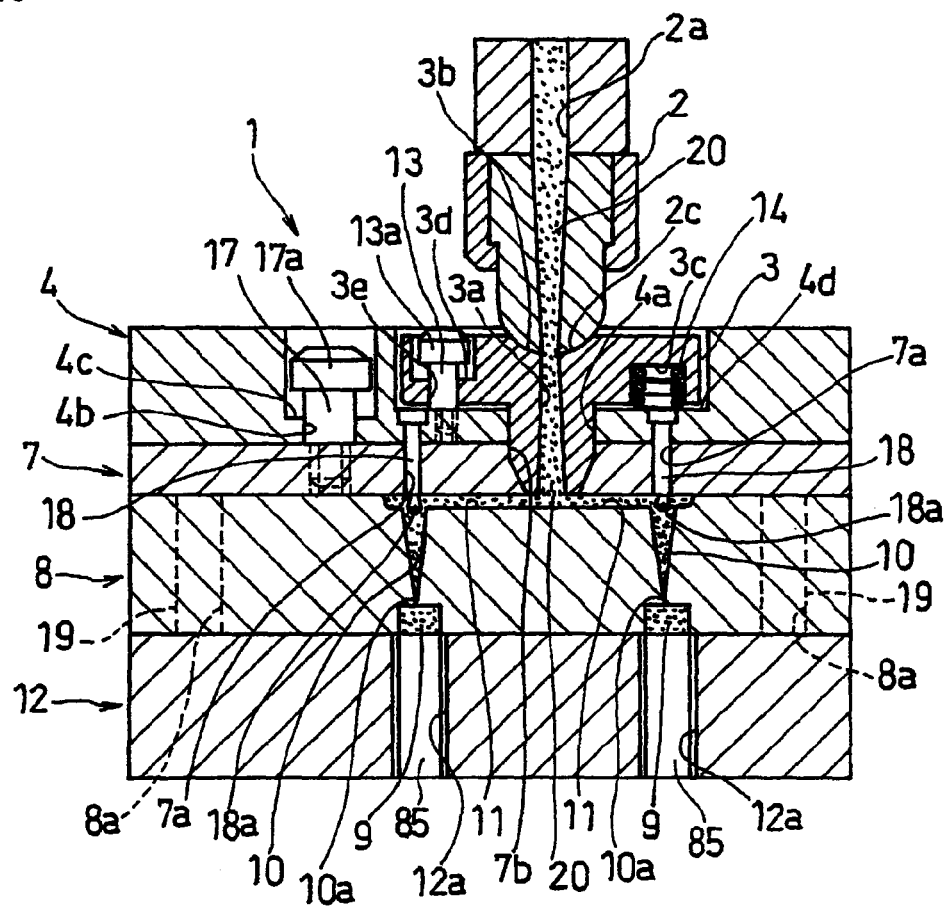
FIG. 3 is a longitudinal cross-sectional view of the same apparatus, in which a molding material is filled in the mold.

As described above, when the mold is closed and the injection channel 2a of the nozzle 2 communicates with the sprue 3a of the sprue bushing 4, a molding material 20, comprising a molten resin and supplied through the injection channel 2a of the nozzle 2, is injected from the injection port 2b at a predetermined injection pressure (molding pressure), as illustrated in FIG. 3. The molding material 20 flows through the runner system composed of the sprue 3a, the branch channel 11, and the runners 10, and is filled into the cavities 9 from narrow runner gates 10a at the ends of the runners 10.

When the molding material 20 in each runner 10 solidifies, the locking part 18a at the tip of the lock pin 18 fixed to the bushing holder 4 is inserted in the molding material 20. This is just like insert molding in which the locking part 18a is inserted into the upper part of the runner 10.

When the molding material 20 filled in each cavity 9 solidifies to form a molded part, the resultant first molded part 88 integrally joins the secondary battery 63 and the circuit board 79 of the battery pack intermediate product 85, as illustrated in FIG. 10. At this time, the molding material 20 in the runners 10, the branch channel 11, and the sprue 3a also solidifies to become solidified resins 21, 22, and 23, respectively (see FIG. 4). However, the molding material 20 in the injection channel 2a of the nozzle 2 close to a heat source remains molten without solidifying immediately.

Figure 4:
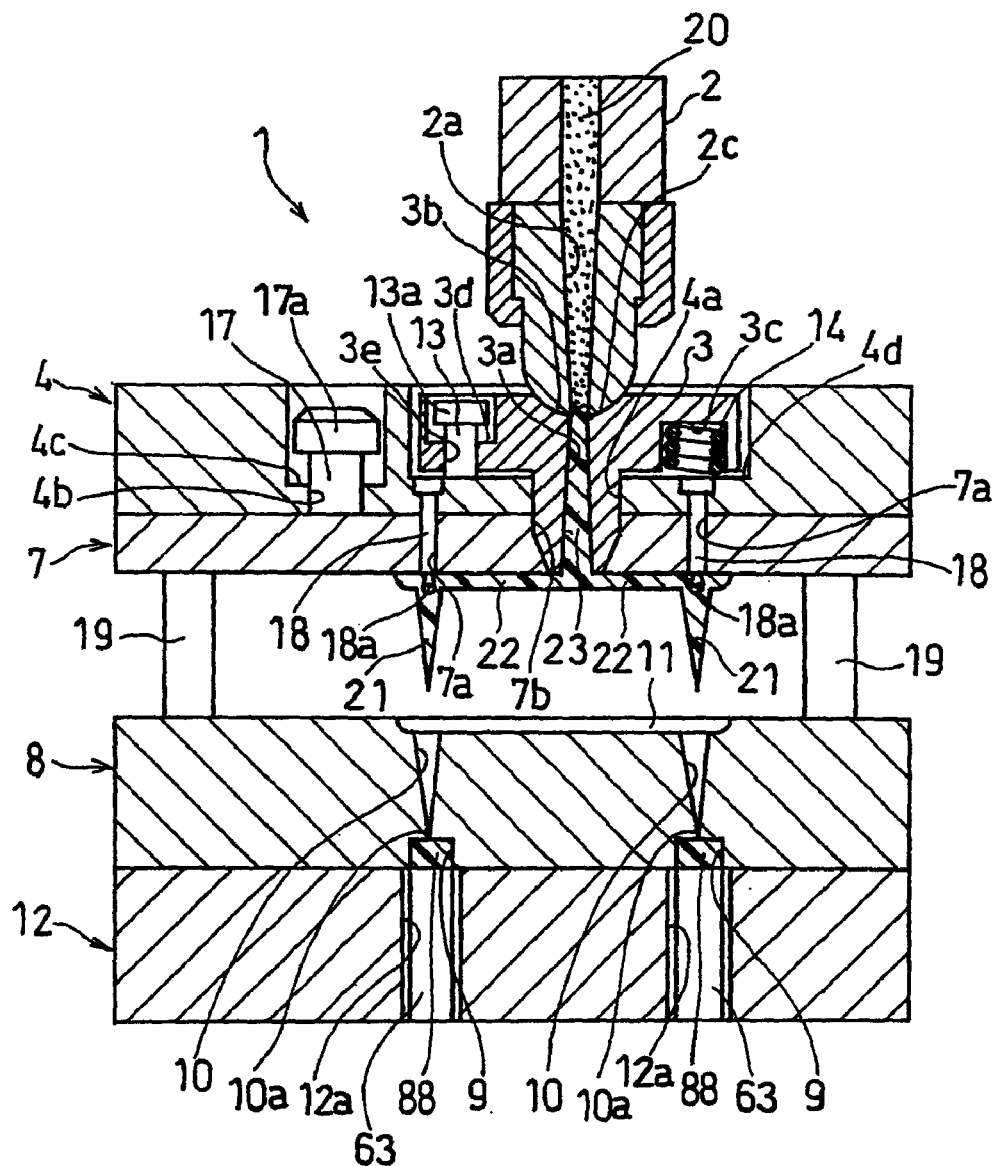
FIG. 4 is a longitudinal cross-sectional view of the same apparatus, in which the runner stripper plate is moved away from the cavity plate.

Next, as illustrated in FIG. 4, the runner stripper plate 7, the bushing holder 4, and the nozzle 2 are integrally lifted up in such a manner that the relative arrangement in the mold closed state illustrated in FIG. 1 is maintained. At this time, since each locking part 18a is firmly embedded in the upper part of the solidified resin 21 in the runner 10, the solidified resin 21 is subjected to a strong lift-up force by the locking part 18. Thus, the solidified resin 21 in the runner 10 is slightly stretched due to the elasticity of the molding material comprising a polyamide adhesive or polyurethane adhesive. This promotes the separation of the solidified resin 21 bonded to the inner surface of the runner 10 therefrom.

On the other hand, the cavity plate 8 is stationary and closely adheres to the base 12 while holding the first molded parts 88 formed by the solidification of the molding material 20 in the cavities 9. As a result, the solidified resin 21 in each runner 10 is reliably cut off at the narrowest runner gate 10a, in which it easily breaks, and is cut off from the first molded part 88 in the cavity 9. As such, the whole solidified resin 21 is pulled out from the runner 10 without breaking halfway. This ensures reliable prevention of problems such as the solidified resin 21 breaking inside the runner 10 so that a part of the lower end thereof remains in the runner 10.

Figure 5:
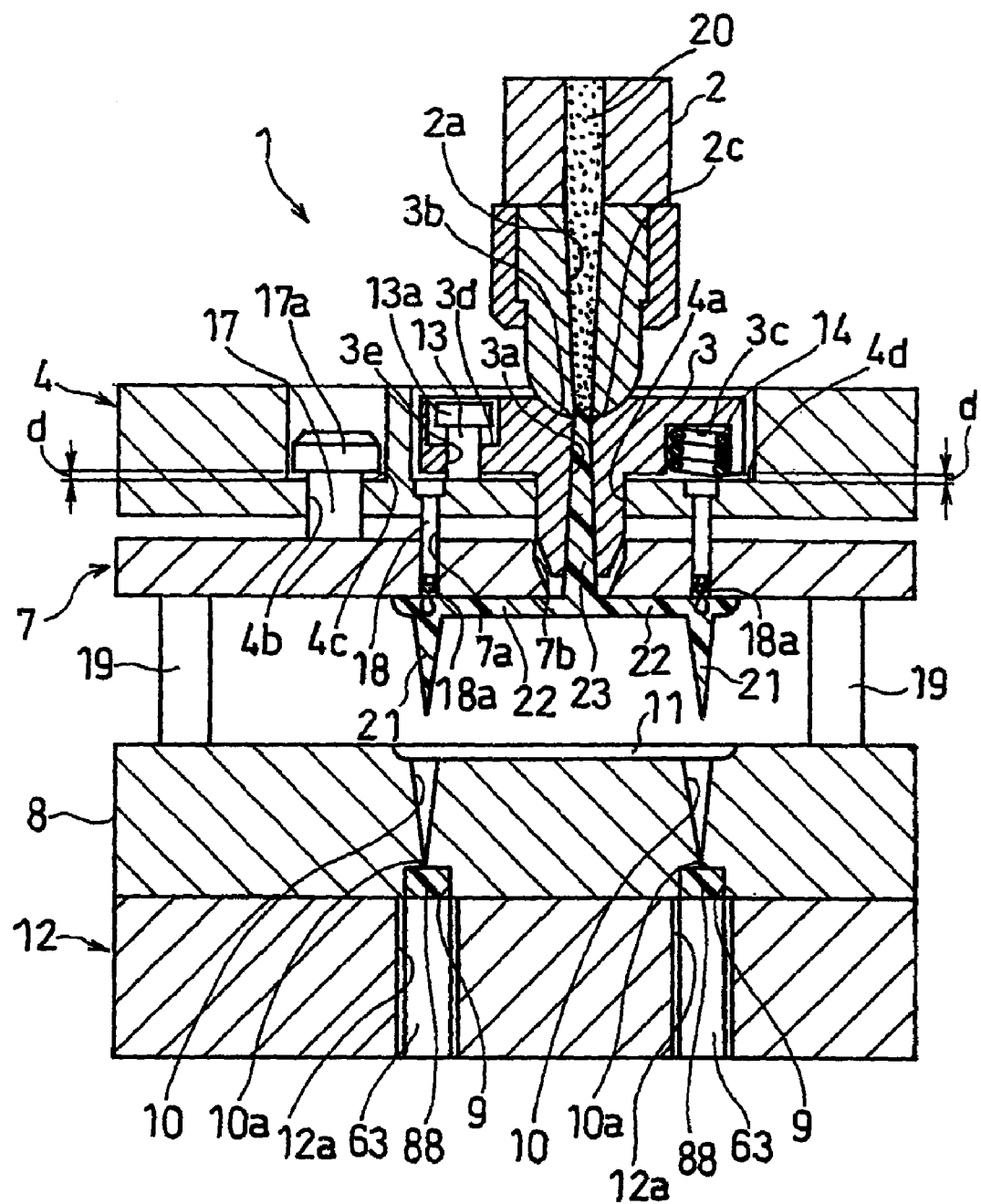
FIG. 5 is a longitudinal cross-sectional view of the same apparatus, in which the locking parts of the lock pins are pulled out of the solidified resin in the runners.

The distance for which the runner stripper plate 7, the bushing holder 4, and the nozzle 2 integrally lift up is regulated by the guide shafts 19. If the distance is excessive, the lift-up of the runner stripper plate 7 is stopped by the guide shafts 19. As a result, as illustrated in FIG. 5, the runner stripper plate 7 is separated from the bushing holder 4. At this time, the bushing holder 4 and the nozzle 2 further lift up integrally in such a manner that the relative arrangement in the mold closed state is maintained, and the lock pins 18 fixed to the bushing holder 4 also lift up integrally. As a result, the locking parts 18a at the lower ends of the lock pins 18 are forcefully pulled out of the upper parts of the solidified resin 21. The distance for which the bushing holder 4 and the nozzle 2 are further lifted up is set to a distance that is necessary and sufficient for pulling out the locking parts 18a from the solidified resin 21.

Also, in the state of FIG. 5, the distance between the lower face of the flange 3g of the sprue bushing 3 and the inner bottom face of the bushing holding part 4d of the bushing holder 4 is set to a dimension substantially equal to the distance d between the bottom face of the regulating shaft containing recess 4c of the bushing holder 4 and the head 17a of the position regulating shaft 17.

Figure 6:
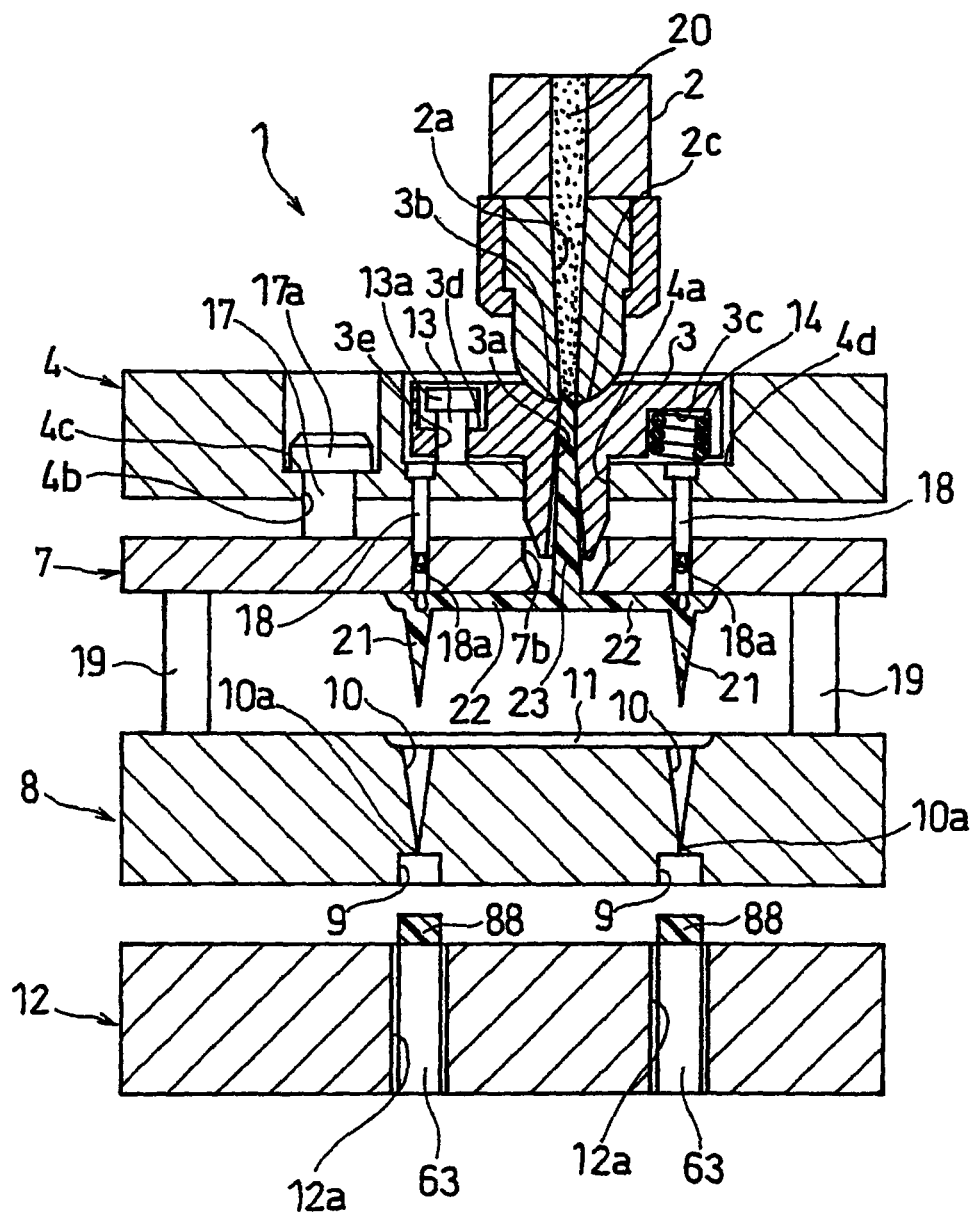
FIG. 6 is a longitudinal cross-sectional view of the same apparatus, in which the solidified resin in the sprue is separated from the inner surface of the sprue.

Next, as illustrated in FIG. 6, the bushing holder 4 and the nozzle 2 are integrally lifted up. At this time, the distance for which the bushing holder 4 lifts up from the runner stripper plate 7 is regulated by the abutment of the head 17a of the position regulating shaft 17 against the bottom face of the regulating shaft containing recess 4c of the bushing holder 4.

That is, the bushing holder 4 and the nozzle 2 integrally lift up from the runner stripper plate 7 for a distance corresponding to the distance d in FIG. 5.

The bushing holder 4 and the nozzle 2 having lifted up for the distance d are held stationary at that height position for a certain period of time as described later. At this time, the sprue bushing 3 also lifts up integrally with the nozzle 2, with the nozzle abutting recess 3b being in contact with the tip 2c of the nozzle 2 due to the force applied by the push-up springs 14. In other words, in Embodiment 1, the force applied by the push-up springs 14 is set to a spring pressure capable of integrally pushing up the sprue bushing 3 while keeping the contact between the nozzle abutting recess 3b and the rising nozzle 2. At this time, since the runner stripper plate 7 has been moved to the upper limit position in the state of FIG. 5, the solidified resin 22 in the branch channel 11 adhering to the lower face of the runner stripper plate 7 and the solidified resin 21 in the runners 10 are also held at the height position shown in FIG. 5.

Therefore, in the state of FIG. 6, the solidified resin 23 in the sprue 3a is subjected to an upward tensile force applied by the sprue bushing 3 having lifted up with the nozzle 2. This tensile force causes the solidified resin 23 to be vertically stretched due to the elasticity of the resin comprising a polyamide adhesive or polyurethane adhesive. When the solidified resin 23 is vertically stretched, the diameter of the cross-section of the solidified resin 23 decreases with time and the solidified resin 23 gradually separates from the inner surface of the sprue 3a. That is, by subjecting the solidified resin 23 to a tensile stress in the axial direction of the sprue 3a and maintaining this state for a predetermined time, the solidified resin 23 can be separated from the inner surface of the sprue 3a.

In this way, by lifting up the sprue bushing 3 together with the nozzle 2 by the force applied by the push-up springs 14 for the distance d and maintaining this state for a certain period of time, the solidified resin 23 bonded to the inner surface of the sprue 3a can be separated from the inner surface of the sprue 3a. The reason why the solidified resin 23 is separated from the inner surface of the sprue 3a in this way is that if the nozzle 2 is lifted up from the sprue bushing 3 to cut off the solidified resin 23 from the nozzle 2 without such process, the solidified resin 23 is subjected to an excessive tensile force in one stroke, thereby resulting in a problem of breakage of the solidified resin 23 inside the sprue 3a.

At this time, the distance for which the sprue bushing 3 is lifted up by the push-up springs 14 together with the nozzle 2 is adjusted to such a distance that the solidified resin 23 in the sprue 3a does not break halfway although the diameter of the cross-section thereof decreases. The adjustment is achieved by mechanical regulation of the abutment of the lower face of the head 13 of each bushing guide shaft 13 against the bottom face of the guide shaft containing recess 3d of the sprue bushing 3.

Also, the certain period of time for which the lifted bushing holder 4 and nozzle 2 are maintained in that state is set to a period of time that is long enough for the solidified resin 23 to be substantially separated from the inner surface of the sprue 3a and that is so short that the solidification of the molding material 20 in the injection channel 2a of the nozzle 2 does not start.

Upon completion of the step of separating the solidified resin 23 from the inner surface of the sprue 3a, the nozzle 2 is further lifted up and moved away from the sprue bushing 3, as illustrated in FIG. 7. At this time, the nozzle 2 is not lifted up straight to the upper limit position illustrated in the figure; first, it is lifted up to a position in which the tip 2c is slightly spaced from the nozzle abutting recess 3b. The lift-up of the nozzle 2 is stopped at that position for a predetermined time, and in this state, a cooling means (not shown) disposed at the lower end of the nozzle 2 is driven. As a result, the molding material 20 in the injection channel 2a near the injection port 2b solidifies to become resin 27.

When the injection port 2b is closed with the resin 27, then the nozzle 2 is lifted up to the upper limit position. As a result, the resin 27 is cut off from the solidified resin 23 and, as the nozzle 2 is moved away, the sprue bushing 3 is pushed up by the force applied by the push-up springs 14. At this time, the upper end portion of the cut-off solidified resin 23 is forcefully drawn into the sprue 3a due to the high elasticity thereof. It should be noted that when a polyamide adhesive or polyurethane adhesive solidifies, it exhibits rubber-like elasticity and high adhesive power. Also, the solidified resin 27 also performs the function of closing the exit of the injection channel 2a to prevent the molding material 20 in the injection channel 2a from flowing out. Also, in the next molding cycle, the resin 27 is remelted by the heat from the molding material 20 that is positioned thereabove.

The solidified resins 23, 22, and 21 remaining in the sprue 3a, the branch channel 11, and the runners 10 can be easily removed by merely applying a small force (e.g., pulling it down by a worker) for the following reasons: the locking part 18a of the lock pin 18 has been pulled out from the upper part of the solidified resin 21 in the runner 10; the solidified resin 23 in the sprue 3a has been separated from the inner surface of the sprue 3a; and the cross-sectional shape of the sprue 3a widens toward the end. Alternatively, it is also possible to let them drop naturally.

Next, the molding of the second molded part 89 is described. The molding of the second molded part 89 is achieved by using a cavity plate with cavities shaped so as to conform to the second molded part 89 shown by the chain double-dashed line in FIG. 10 in place of the cavity plate 8 of the apparatus of this embodiment, and performing substantially the same steps as those for molding the first molded part 88. Hence, the detailed description thereof is omitted.

As described above, in the molding apparatus of Embodiment 1, the use of a molten polyamide adhesive or polyurethane adhesive as the molding material makes it possible to form a molded part without any adverse effect on the secondary battery and the heat sensitive element due to heat and pressure, to obtain a battery pack intermediate product. It is also possible to shorten the molding time and further enhance productivity. Also, a tensile stress is applied to the solidified resin bonded to the inner surface of the sprue such that the diameter of the cross-section thereof decreases, and this state is maintained for a certain period of time. As a result, the solidified resin is substantially separated from the inner surface of the sprue. In this state, a force is applied to cut off the solidified resin from the nozzle. This can prevent the solidified resin from breaking halfway and remaining in the sprue.

Embodiment 2

Embodiment 2 of the invention is hereinafter described. Since Embodiment 2 is an alteration of Embodiment 1, the differences from Embodiment 1 are mainly described below.

Figure 8A:
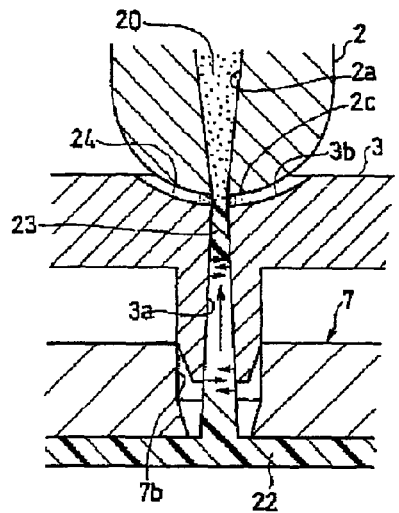
FIG. 8A is an enlarged cross-sectional view showing the contact portion between the nozzle and the sprue bushing of a molding apparatus used in the battery pack production method of Embodiment 2 of the invention, in which the nozzle is slightly lifted up and moved away from the sprue bushing.
Figure 8B:
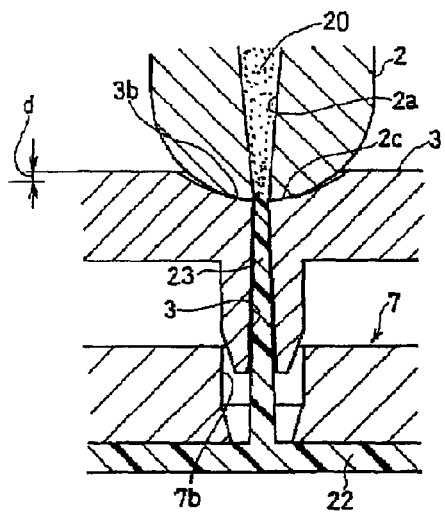
FIG. 8B is an enlarged cross-sectional view, similar to FIG. 8A, in which the sprue bushing moves up following the lift-up of the nozzle so that the two components contact each other.

In Embodiment 2, instead of the step of FIG. 6 of Embodiment 1, a step which will be described with reference to FIG. 8A and FIG. 8B is performed. That is, when the solidified resin 23 is strongly bonded to the inner surface of the sprue 3a by the strong adhesive power of the molding material, lifting up the sprue bushing 3 in one stroke may cause breakage even if it is lifted up only for the distance d for applying such a tensile stress that the solidified resin 23 does not break. Thus, the elasticity of the push-up springs 14 is set to such elasticity that the sprue bushing 3 cannot be pushed up integrally with the bushing holder 4 when the bushing holder 4 lifts up from the state of FIG. 5. As a result, as illustrated in FIG. 8A, when the bushing holder 4 and the nozzle 2 are integrally lifted up to the height position shown in FIG. 6, the sprue bushing 3 remains in the position shown in FIG. 5a, so a small gap 24 is formed between the sprue bushing 3 and the nozzle 2.

At this time, in the injection channel 2a of the nozzle 2, the molding material 20 remains molten without solidifying, since it is close to the heat source. Thus, the molding material 20 in the injection channel 2a flows into the gap 24. However, the amount of the molding material 20 flowing into the gap 24 is slight, since the molding pressure can be set low in the invention and the gap 24 is small. Also, when a slight gap is formed for some reason between the tip 2c of the nozzle 2 and the nozzle abutting recess 3b of the sprue bushing 3 during the injection of the molding material 20 shown in FIG. 3, and the molding material 20 leaks out into the gap to form solidified resin, this solidified resin is remelted by the molding material 20 flowing into the gap 24.

Figure 16:
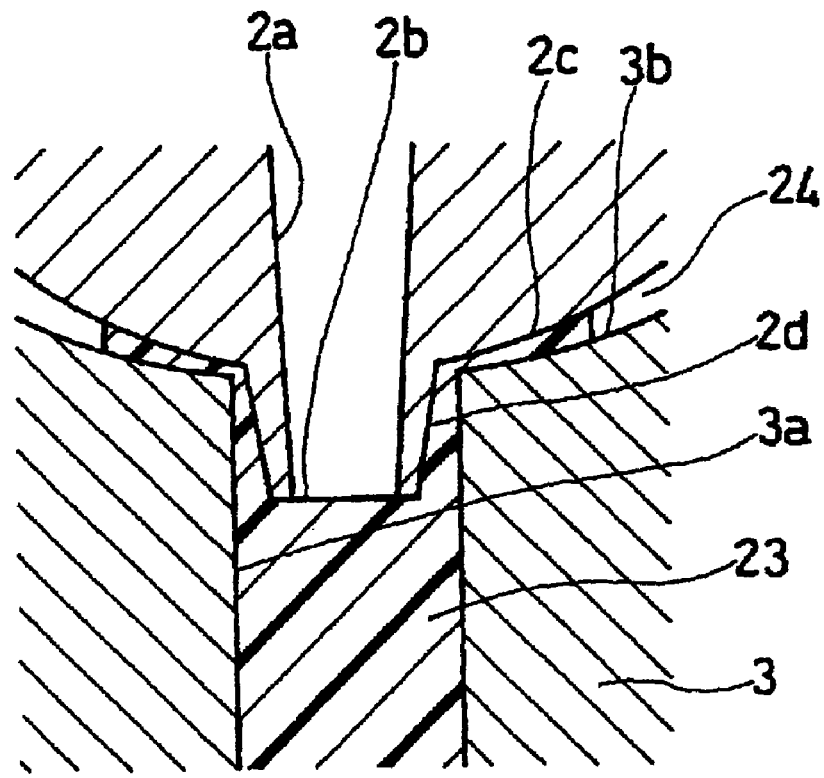
FIG. 16 is a partially enlarged cross-sectional view of the nozzle tip and sprue bushing of a molding apparatus in a modified example of the invention.
Figure 17:
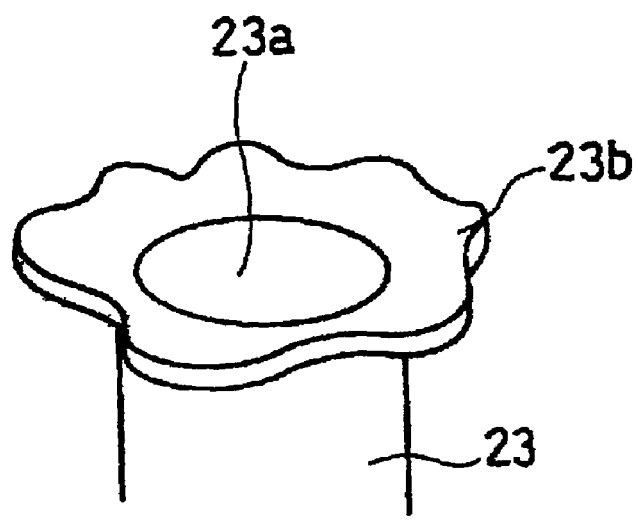
FIG. 17 is an enlarged perspective view of the upper end of solidified resin formed in the sprue of the molding apparatus in the same modified example.

Also, as illustrated in FIG. 16, the tip 2c of the nozzle 2 can be provided with a protrusion 2d that is shaped so as to be inserted into the sprue 3a. In this case, the molding material 20 is injected into the sprue 3a, with the protrusion 2d at the tip of the tip 2c of the nozzle 2 being inserted into the sprue 3a. As a result, the molding material 20 having flown into the gap 24 between the sprue bushing 3 and the tip 2c of the nozzle 2 solidifies while adhering to the upper end of the solidified resin 23 in the sprue 3a, so that a burr 23b having an aperture 23a in the center is formed as illustrated in FIG. 17.

In this way, the molding material 20 is injected into the sprue 3a, with the protrusion 2d at the tip 2c of the nozzle 2 being inserted into the sprue 3a. Thus, the gap between the sprue 3a and the protrusion 2d becomes small, and the amount of the molding material 24 flowing into the gap 24 between the sprue bushing 3 and the tip 2c of the nozzle 2 also becomes small. Hence, the burr 23b solidifies in a short time. Also, since the burr 23b has a small volume, it is easily remelted by the molding material 20 having flown into the gap 24.

Further, when the solidified resin 23 in the sprue 3a is pulled down to remove the solidified resin 23 from the sprue 3a, the burr 23b adhering to the upper end thereof is also pulled into the sprue 3a. At this time, since the burr 23b has the aperture 23a in the center thereof, the burr 23b has a low strength and easily deforms, so that it is pulled into the sprue 3a from the upper end opening of the sprue 3a. It is therefore possible to prevent the burr 23b from getting snagged on the upper end open edge of the sprue 3a and thus prevent the solidified resin 23 from breaking in the sprue 3a.

Also, while the sprue bushing 3 remains in the position shown in FIG. 5, the bushing holder 4 is moved upward. Thus, the push-up springs 14 are compressed in an amount corresponding to the amount of movement of the bushing holder 4, and the elasticity of the push-up springs 14 is heightened. Due to the high elasticity, the sprue bushing 3 is gradually lifted up. When the sprue bushing 3 is lifted up, the solidified resin 23 is subjected to an upward tensile force by the rising sprue bushing 3, as shown by the arrow in FIG. 8A. This tensile force serves as a force that separates the solidified resin 23 from the inner surface of the sprue 3a, i.e., a force that deforms the solidified resin 23 such that the diameter of the cross-sectional shape of the solidified resin 23 decreases. As a result, the solidified resin 23 is stretched upward and gradually separated from the inner surface of the sprue 3a without breaking in the sprue 3a.

After the lapse of a certain period of time in the state of FIG. 8A, as illustrated in FIG. 8B, the sprue bushing 3 is lifted up for a distance corresponding to the distance d in FIG. 5, so that the solidified resin 23 is almost completely separated from the inner surface of the sprue 3a while being deformed and stretched upward. At this time, the sprue bushing 3 is lifted up by the force applied by the push-up springs 14 and again comes into contact with the nozzle 2. The period of time for which the lifted bushing holder 4 and nozzle 2 are kept stationary is set to a period of time that is long enough for the solidified resin 23 to be substantially separated from the inner surface of the sprue 3a and that is so short that the solidification of the molding material 20 in the injection channel 2a of the nozzle 2 does not start, in the same manner as in Embodiment 1.

Also, since the molding material 20 in the gap 24 has not completely solidified and is not strongly bonded to the nozzle abutting recess 3b, it is drawn into the sprue 3a while adhering to the upper end of the solidified resin 23.

Embodiment 3

Embodiment 3 of the invention is hereinafter described. Since Embodiment 3 is an alteration of Embodiment 1, the differences from Embodiment 1 are mainly described below.

In Embodiment 3, at least one of the cavity plate 8 and the sprue bushing 3 is formed from heat-treated steel as the base material, and the inner surfaces of the runners 10 and the sprues 3a provided therein are formed so as to have a surface roughness of 10 to 100 μm by electrical discharge machining.

In the runner 10, the solidified resin 21 is strongly bonded to the inner surface of the runner 10, so it usually has poor mold releasability. However, in Embodiment 3, since the inner surface of the runner 10 is formed so as to have a surface roughness of 10 to 100 μm, the mold releasability of the solidified resin 21 from the runner 10 is improved. As a result, even if the solidified resin 21 is subjected to a strong lift-up force by the locking part 18, it does not break halfway and is separated from the inner surface of the runner 10 in a reliable manner. In this case, it is also possible to prevent the solidified resin from becoming thin and breaking in the narrow runner gate 10a at the border between the runner 10 and the cavity 9 in a reliable manner. Therefore, there is no need to perform the difficult operation of taking out the solidified resin remaining in the runner 10. Also, when the solidified resin adhering to the first molded part 88 is cut off later, it is possible to prevent the first molded part 88 from becoming roughened, deformed, or the like. Thus, it becomes possible to prevent the battery pack 60 from becoming defective in function and appearance. When the inner surface of the runner 10 is formed so as to have a surface roughness of 10 to 50 the mold releasability is further improved, which is preferable.

Also, when the cavity plate 8 is formed of heat-treated steel which permits good surface roughness, and the inner surface of the runner 10 is subjected to electrical discharge machining which allows contours and cavities to be formed stably and highly evenly to provide the required surface roughness, the inner surface of the runner 10 can be formed so as to have the required surface roughness with high machining accuracy. This ensures good mold releasability.

Also, when the inner surface of the sprue 3a is formed so as to have a surface roughness of 10 to 100 μm, the mold releasability of the solidified resin 23 from the sprue 3a is improved. As a result, when the solidified resin 23 is subjected to a tensile force, it separates from the inner surface of the sprue 3a in a reliable manner without breaking. Also, when the inner surface of the sprue 3a is formed so as to have a surface roughness of 10 to 50 μm, the mold releasability is further improved. Also, when the sprue bushing 3 is formed of heat-treated steel which permits good surface roughness, and the inner surface of the sprue 3a is subjected to electrical discharge machining which allows contours and cavities to be formed stably and highly evenly to provide the required surface roughness, the inner surface of the sprue 3a can be formed so as to have the required surface roughness with high machining accuracy. This ensures good mold releasability.

As described above, according to this embodiment, the inner surface of at least a part of the runner system is formed so as to have a surface roughness of 10 to 100 μm to improve the mold releasability of the solidified resin from the inner surface of the runner system. Therefore, when the solidified resin is pulled out of the runner system, it is possible to prevent the solidified resin from breaking in a more reliable manner.

Embodiment 4

Embodiment 4 of the invention is hereinafter described. Since Embodiment 4 is an alteration of Embodiment 1, the differences from Embodiment 1 are mainly described below.

Figure 12A:
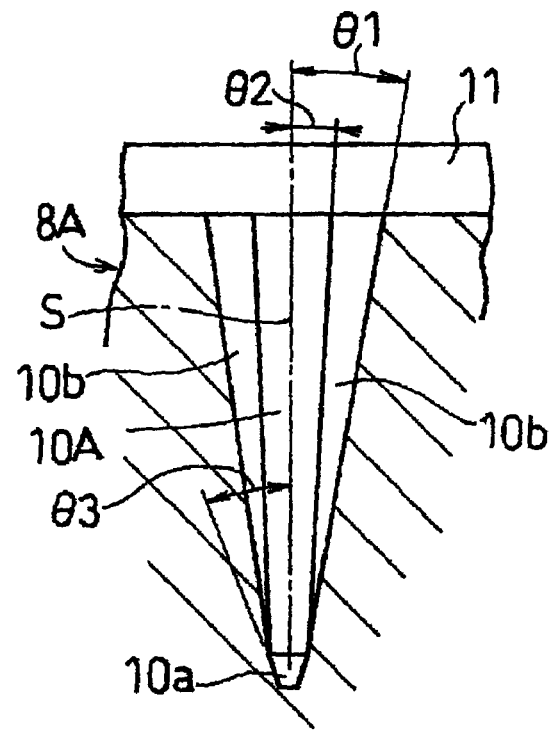
FIG. 12A is a cross-sectional view of the main part of the cavity plate of a molding apparatus used in the battery pack production method according to Embodiment 4 of the invention.
Figure 12B:
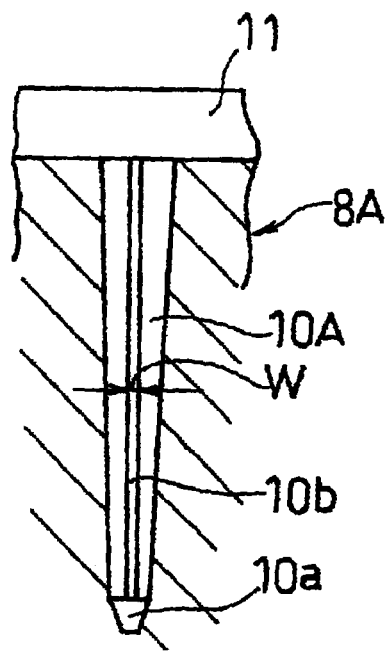
FIG. 12B is a side cross-sectional view of the same cavity plate.

In Embodiment 4, as illustrated in FIG. 12A and FIG. 12B, which are a front cross-sectional view and a side cross-sectional view of a cavity plate 8A, respectively, a runner 10A has a rib-forming part 10b that protrudes outwardly in two opposing directions of the diameter thereof.

Figure 12C:
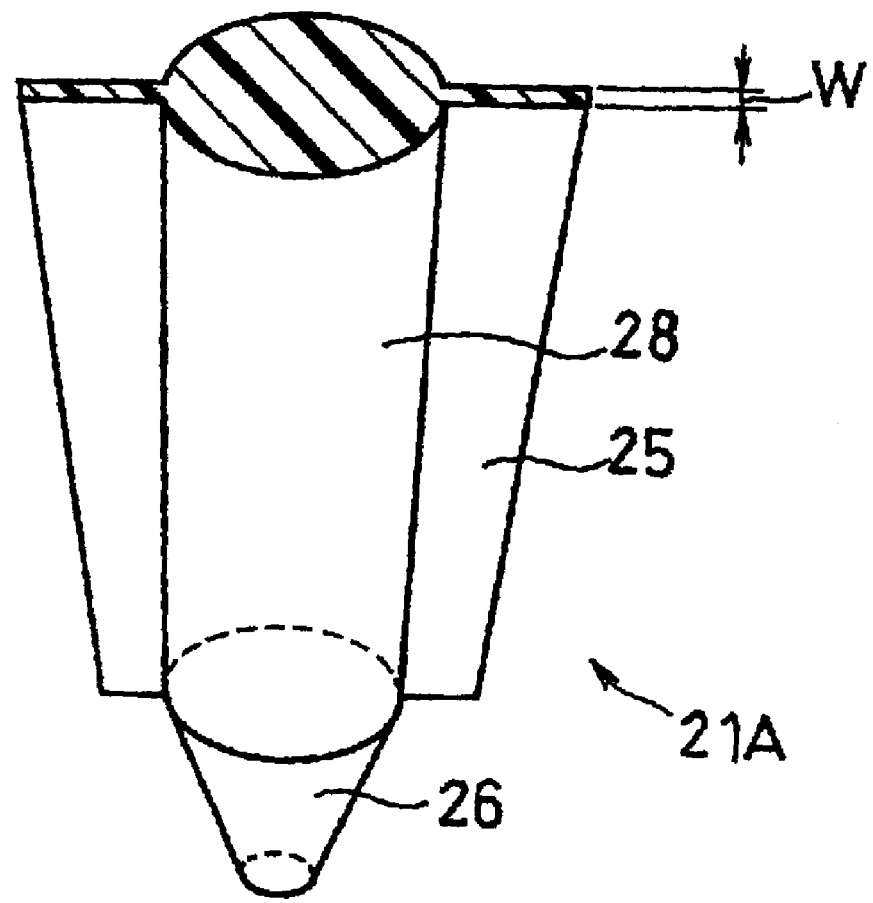
FIG. 12C is a perspective view of solidified resin formed in the runner of the same apparatus.

FIG. 12C is a perspective view schematically showing the shape of solidified resin 21A formed in the runner 10A when the cavity plate 8A of Embodiment 4 is used. The solidified resin 21A is composed of a rib 25 formed on the solidified resin 21 of Embodiment 1, and the rib 25 protrudes outwardly in two opposing directions of the diameter thereof. The rib-forming part 10b of the runner 10A is shaped so that the rib 25 formed on the solidified resin 21A is thin and flat and has a thickness W of approximately 0.3 to 0.7 mm.

Also, as illustrated in FIG. 12A, the side end faces of the rib-forming part 10b have a tapered shape so that they widen toward the runner stripper plate 8 side (upper side in the figure) slantwise at an angle θ1 of 10 to 12° relative to the central axis S of the runner 10. The runner gate 10a has a tapered shape so that it widens toward the runner stripper plate 8 side slantwise at an angle θ3 of 55° relative to the central axis S. Therefore, solidified resin 26 of inverted circular truncated cone shape illustrated in FIG. 12C is formed in the runner gate 10a. Also, the inner surface of the portion of the runner 10A excluding the rib-forming part 10b has a tapered shape so that it widens toward the runner stripper plate 8 side slantwise at an angle θ2 of 2° relative to the central axis S of itself. In this portion, a solidified resin axial part 28 having the same shape as the solidified resin 21 formed in the runner 10 in Embodiment 1 is formed.

As described above, since the rib 25 is formed on the solidified resin 21A, when the solidified resin 21A is pulled out of the runner 10A, the solidified resin 21A strongly bonded to the inner surface of the runner 10A can be easily separated and pulled out from the inner surface of the runner 10A without breaking halfway.

In particular, since the rib 25 has a thin, flat shape having a thickness of 0.3 to 0.7 mm, it solidifies sooner than the other portions of the solidified resin 21A, such as the solidified resin axial part 28. As such, the rib 25 has a higher strength than the solidified resin axial part 28, thereby making it possible to effectively prevent the solidified resin axial part 28 from breaking by tensile force. In addition, since the side end faces of the rib 25 formed in the rib-forming part 10b have the tapered shape, they can be pulled out more easily. Also, since the solidified resin 21A is reinforced with the flat rib 25, it is possible to reduce the diameter of the solidified resin axial part 28, which is necessary for ensuring the necessary strength. As a result, the volume of the solidified resin discarded after the molding can be reduced, and the material loss can be reduced.

Figure 13:
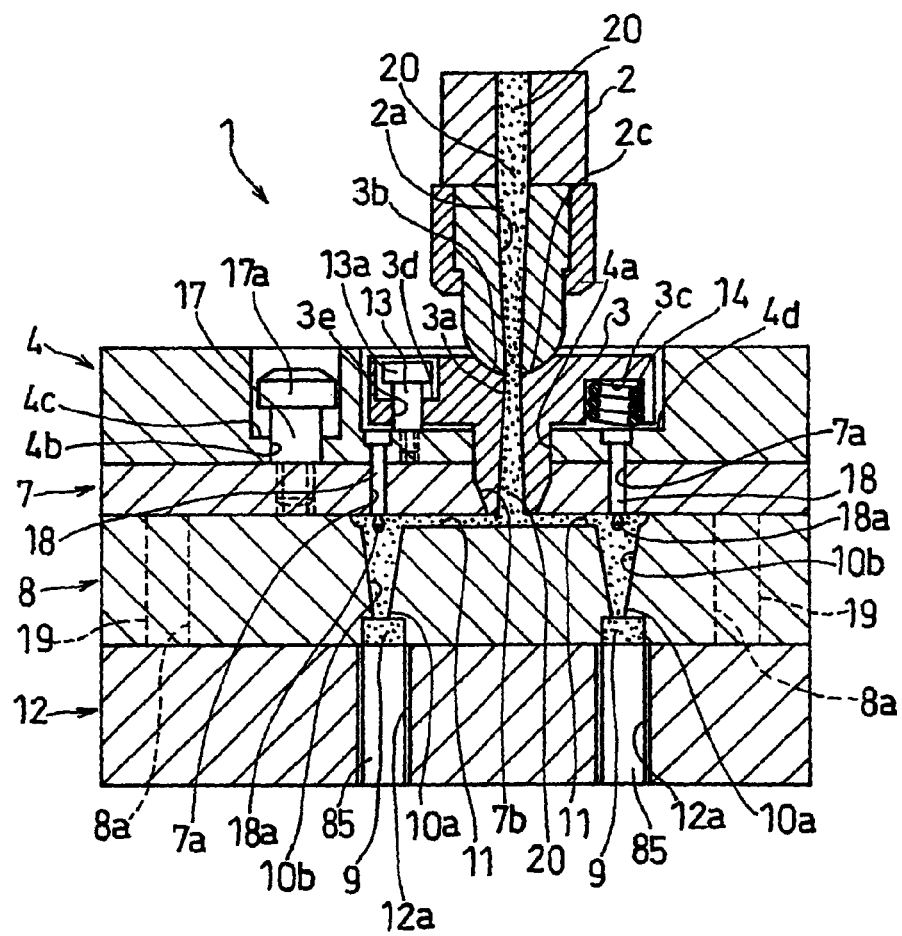
FIG. 13 is a view of the same apparatus similar to FIG. 3.
Figure 14:
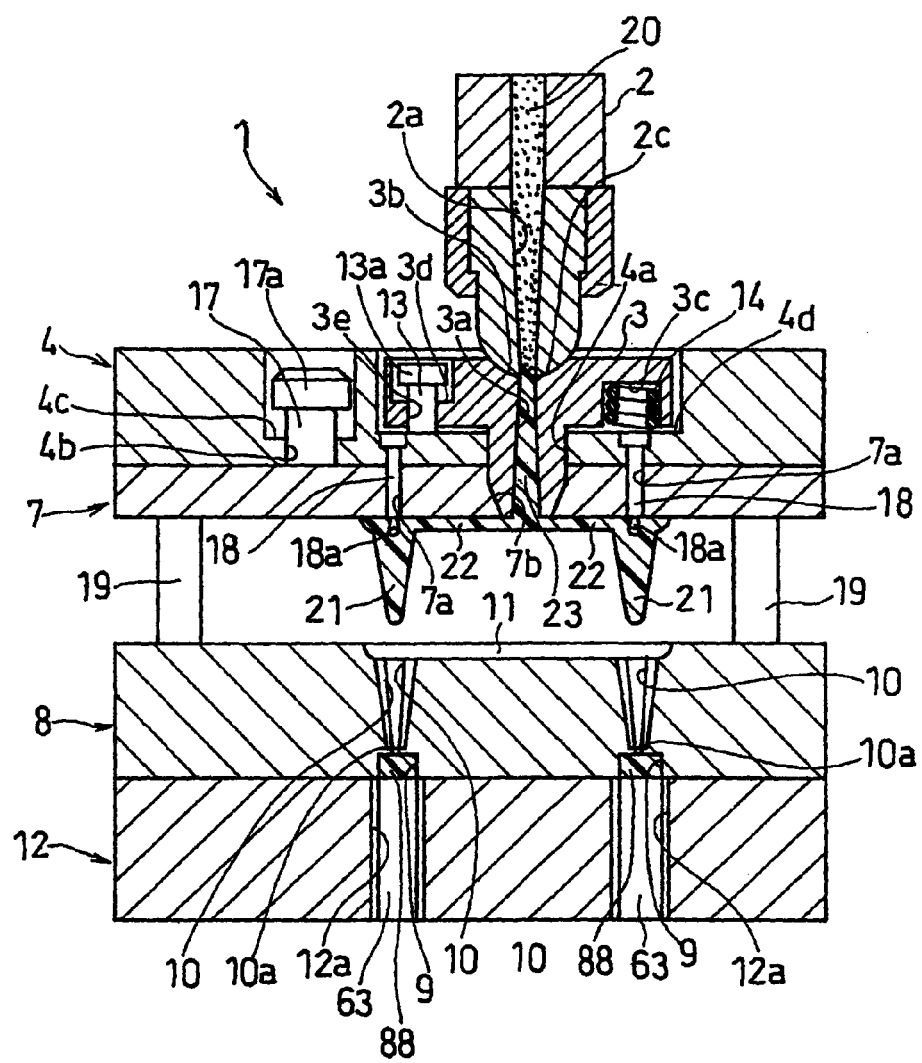
FIG. 14 is a view of the same apparatus similar to FIG. 4.

FIG. 13 shows a state similar to FIG. 3 in Embodiment 1.
FIG. 14 shows a state similar to FIG. 4 in Embodiment 1.

Figure 15A:
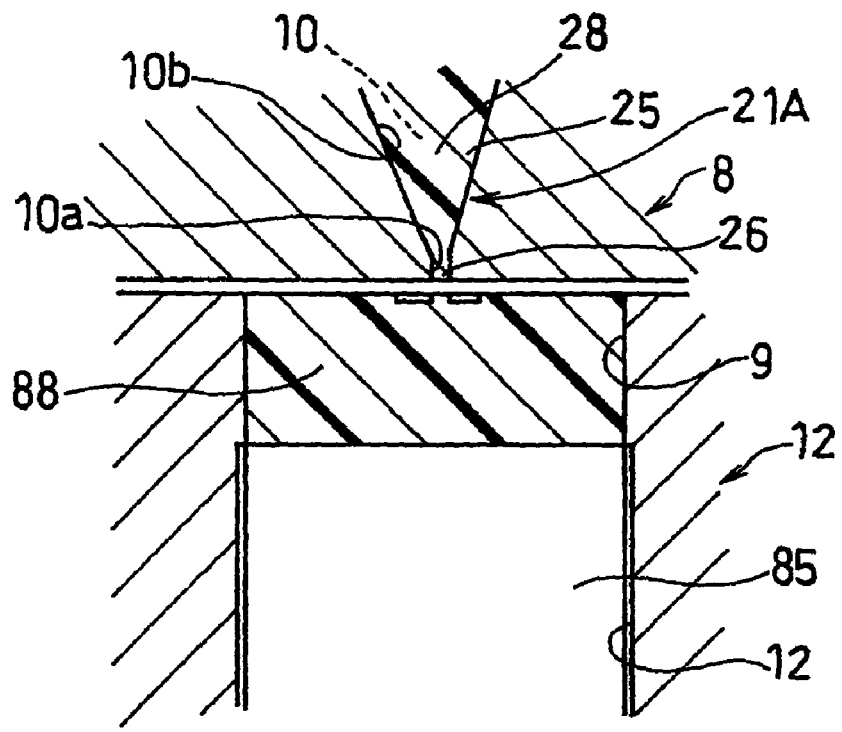
FIG. 15A is a longitudinal cross-sectional view of the main part of the base and cavity plate of the same apparatus, in which solidified resin in the runner is cut off from the molded part.

Also, when the solidified resin 21A is cut off from the first molded part 88, the runner stripper plate 7 lifts up while the cavity plate 8 holding the first molded part 88 in the cavity 9 is held stationary on the base 12, as illustrated in FIG. 15A. As a result, the solidified resin 21A is always cut off from the first molded part 88 stably at the border between the first molded part 88 and the thinnest solidified resin 26 formed in the narrow runner gate 10a. Hence, the first molded part 88 is free from damage, deformation, cracks, etc., and the produced battery pack 60 is free from any defects in performance and appearance.

Figure 15B:
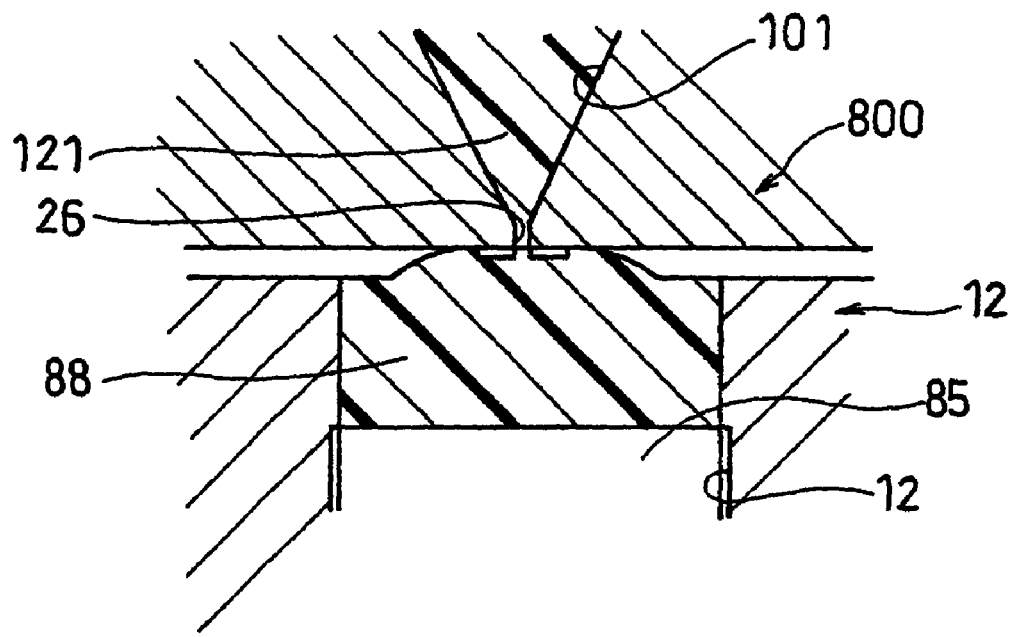
FIG. 15B is a longitudinal cross-sectional view of the main part of the base and cavity plate of a molding apparatus in a comparative example, in which solidified resin in the runner deforms the upper portion of the molded part without being cut off from the molded part.

For comparison, FIG. 15B illustrates a cavity plate 800 having only a runner 101 without the rib-forming part 10b. FIG. 15B shows a state in which the lower part of solidified resin 121 breaks and remains in the runner 101. When the cavity plate 800 is lifted up with the broken lower part of the solidified resin 121 remaining in the runner 101, the portion of the first molded part 88 coupled to the remaining part of the solidified resin 121 by the solidified resin 26 in the runner gate 10a is pulled. As a result, as illustrated in the figure, the upper face of the first molded part 88 deforms so as to expand upward. Such deformation causes the produced battery pack 60 to become defective in performance and appearance.

As described above, according to this embodiment, since the runner 10A has the rib-forming part 10b, the rib 25 is formed on the solidified resin 21A in the runner 10A. Therefore, when the solidified resin 21A is pulled out of the runner 10A, it is possible to prevent the solidified resin 21A from breaking halfway and partially remaining in the runner 10A.

Industrial Applicability

According to the invention, in the production of a battery pack intermediate product comprising a secondary battery and a circuit board which are integrally joined by a resin molded part, solidified resin in the runner system of the mold can be easily removed. Thus, the productivity of the battery pack can be increased.

The invention claimed is:

1. A method for producing a battery pack, comprising a step (a) of forming a molded part between an end face of a secondary battery on a seal plate side and a circuit board disposed so as to face the end face thereof, to produce a battery pack intermediate product comprising the secondary battery and the circuit board which are joined integrally,
    wherein the step (a) includes:
    a step (b) of bringing a nozzle into contact with a molding material injection inlet of a mold for forming the molded part, the nozzle being provided for feeding a molding material comprising a resin of polyamide adhesive or polyurethane adhesive to the mold;
    a step (c) of, after the formation of the molded part, moving the nozzle away from the molding material injection inlet to cut off, from the nozzle, solidified resin that is formed by solidification of the molding material in a runner system of the mold connected to the molding material injection inlet; and
    a step (d) of applying a predetermined tensile stress to the solidified resin and maintaining this state for a predetermined time to separate the solidified resin bonded to an inner surface of the runner system therefrom, the step (d) being performed as a pretreatment for the step (c);

wherein the runner system comprises a sprue connected to the molding material injection inlet and a plurality of runners branching off from the sprue, the step (d) is a step of separating solidified resin formed in the sprue by solidification of the molding material and bonded to an inner surface of the sprue therefrom, and the step (d) is performed by moving a sprue bushing having the sprue and the nozzle away from a runner stripper plate holding solidified resin formed in the runners by solidification of the molding material for a predetermined distance, and maintaining this state for a predetermined time.

2. The method for producing a battery pack in accordance with claim 1, wherein the sprue bushing is held in a bushing holder in such a manner that it is capable of moving toward and away from the nozzle in a predetermined range and is biased toward the nozzle against pressure from the nozzle, the nozzle is moved so that the biased sprue bushing follows the movement of the nozzle and moves away from the runner stripper plate for a predetermined distance, thereafter the nozzle is further moved away from the runner stripper plate beyond the predetermined range to cut off the solidified resin formed in the sprue from the nozzle.

3. The method for producing a battery pack in accordance with claim 1, wherein the sprue bushing is held in a bushing holder in such a manner that it is capable of moving toward and away from the nozzle in a predetermined range and is biased toward the nozzle against pressure from the nozzle, and when the nozzle is moved away from the runner stripper plate for the predetermined distance, the biased sprue bushing is moved away from the runner stripper plate, following the nozzle.

4. The method for producing a battery pack in accordance with claim 1, further including a step (e) of cutting off the solidified resin formed in the runners from the molded parts, wherein the step (e) includes:

a step (e1) of inserting a locking part provided at a tip of a lock pin into each of the runners in advance, the locking pin being provided movably relative to a movable cavity plate including the runners and cavities in which the molded parts are formed;

a step (e2) of allowing the molding material to solidify in the runners such that the molding material is joined to the locking parts; and a step (e3) of moving the lock pins away from the cavity plate that is held stationary and holds the molded parts in the cavities.

5. The method for producing a battery pack in accordance with claim 2, wherein the molding material in the nozzle is held molten until the nozzle is moved away from the sprue bushing to cut off the solidified resin from the nozzle.

6. The method for producing a battery pack in accordance with claim 1, wherein at least a part of an inner surface of the runner system is formed so as to have a surface roughness of 10 to 100 μm.

7. The method for producing a battery pack in accordance with claim 1, further including a step (e) of cutting off the solidified resin formed in the runners by the solidification of the molding material from the molded parts, wherein the step (e) includes:

a step (e4) of inserting a locking part provided at a tip of a lock pin into each of the runners in advance, the locking pin being provided movably relative to a movable cavity plate which includes cavities in which the molded parts are formed and the runners each having a rib forming part;

a step (e5) of allowing the molding material to solidify in the runners such that the molding material is joined to the locking parts; and a step (e6) of moving the lock pins away from the cavity plate that is held stationary and holds the molded parts in the cavities.

8. An apparatus for producing a battery pack, the battery pack production comprising forming a molded part between an end face of a secondary battery on a seal plate side and a circuit board disposed so as to face the end face thereof, to produce a battery pack intermediate product comprising the secondary battery and the circuit board which are jointed integrally, the apparatus comprising:

a plurality of nozzles capable of moving forward and backward in predetermined directions, each of the nozzles being provided for feeding a molding material comprising a resin of polyamide adhesive or polyurethane adhesive to one or more cavities for forming the molded part;

a cavity plate provided in the direction the nozzles move forward, the cavity plate having the cavities and runners communicating with the cavities;

a sprue bushing provided between each of the nozzles and the cavity plate, the sprue bushing having a sprue therethrough corresponding to each of the nozzles, the sprue communicating with the runners, the sprue having at one end an opening against which the nozzle is to be pressed, a bushing holder provided between the sprue bushings and the cavity plate, the bushing holder capable of moving forward and backward in directions parallel to the directions in which the nozzles move forward and backward, the bushing holder holding the sprue bushings in such a manner that the sprue bushings are capable of moving toward and away from the nozzles in the directions;

means for biasing the respective sprue bushings from the bushing holder toward the nozzles; and a runner stripper plate provided between the sprue bushing holder and the cavity plate, the runner stripper plate capable of moving between a molding position for forming the molded parts, in which position the runner stripper plate closely adheres to the cavity plate, and a cut-off position which is a predetermined distance away from the molding position toward the nozzles, the runner stripper plate being configured to move from the molding position to the cut-off position while holding solidified resin formed in the runners by solidification of the molding material, thereby cutting off the solidified resin forted in the runners from the molded parts, wherein the runner stripper plate holding the solidified resin is moved away from the nozzles and the sprue bushings, so as to apply a tensile strength that is small so as not to cause breakage of solidified resin formed in the sprues by solidification of the molding material and that is so large as to separate the solidified resin formed in the sprues from inner surfaces of the sprues due to a reduction in the diameter of the cross sectional area of the solidified resin, and this state is maintained for a predetermined time.

9. The apparatus for producing a battery pack in accordance with claim 8, wherein the biasing means comprises elastic members disposed between each of the sprue bushings and the bushing holder at a predetermined angle pitch along a circle whose central axis is the sprue, and a plurality of bushing guide shafts are provided at mid positions between the elastic members that are adjacent along the circle, the bushing guide shafts being configured to prevent separation of the sprue bushing from the bushing holder by being fixed to the bushing holder at one end and engaging with the sprue bushing at the other end.

10. The apparatus for producing a battery pack in accordance with claim 8, comprising a lock pin being fixed to the bushing holder at one end and having a locking part to be inserted into the runner at the other end, the other end being configured to be slidably inserted into an insertion hole in the runner stripper plate.

11. The apparatus for producing a battery pack in accordance with claim 8, comprising a plate guide shaft for setting the cut-off position of the runner stripper plate to a position in which the whole solidified resin formed in the runners by the solidification of the molding material come out of the runners, the plate guide shaft being configured to guide the movement of the runner stripper plate.

12. The apparatus for producing a battery pack in accordance with claim 8, comprising a moving distance regulating shaft fixed to the runner stripper plate at one end and engaging with the bushing holder at the other end, thereby setting the distance for which the bushing holder is moved away from the runner stripper plate to such a distance that the solidified resin formed in the sprues does not break.

13. The apparatus for producing a battery pack in accordance with claim 8, wherein at least a part of a runner system from each of the nozzles to the one or more cavities including the runners and the sprue is formed so as to have a surface roughness of 10 to 100 μm.

14. The apparatus for producing a battery pack in accordance with claim 13, wherein an inner surface of at least one of the runners and the sprue is formed so as to have a surface roughness of 10 to 100 μm.

15. The apparatus for producing a battery pack in accordance with claim 13,
wherein at least one of the cavity plate and the sprue bushings is formed from heat-treated steel as a base material, and
an inner surface of at least one of the runners and the sprue is formed so as to have a surface roughness of 10 to 50 μm by electrical discharge machining.

16. The apparatus for producing a battery pack in accordance with claim 8, wherein the runners have a rib forming part so that the solidified resin formed in the runner has a rib.

17. The apparatus for producing a battery pack in accordance with claim 16, wherein the rib forming part has such a shape that the rib formed is thin and flat and has a thickness of 0.3 to 0.7 mm.

18. The apparatus for forming a battery pack in accordance with claim 16, wherein the rib forming part has such a shape that the rib formed is tapered so that it widens toward a runner stripper plate side slantwise at an angle of 10 to 12° relative to the central axis of the runner.

* * * * *